US011105992B2

(12) United States Patent
Tanaka et al.

(10) Patent No.: US 11,105,992 B2
(45) Date of Patent: Aug. 31, 2021

(54) OPTICAL FIBER RIBBON AND OPTICAL FIBER CABLE

(71) Applicant: FURUKAWA ELECTRIC CO., LTD., Tokyo (JP)

(72) Inventors: Hiroki Tanaka, Tokyo (JP); Kenji Yokomizo, Tokyo (JP); Tomohiro Ishimura, Tokyo (JP); Hirotaka Watanabe, Tokyo (JP); Yoshihiro Arashitani, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/014,722

(22) Filed: Sep. 8, 2020

(65) Prior Publication Data

US 2020/0400903 A1 Dec. 24, 2020

Related U.S. Application Data

(63) Continuation of application No. PCT/JP2019/009481, filed on Mar. 8, 2019.

(30) Foreign Application Priority Data

Mar. 8, 2018 (JP) .............................. JP2018-041422

(51) Int. Cl.
*G02B 6/44* (2006.01)
(52) U.S. Cl.
CPC ......... *G02B 6/4403* (2013.01); *G02B 6/4494* (2013.01)
(58) Field of Classification Search
CPC ........................... G02B 6/4403; G02B 6/4494
(Continued)

(56) References Cited

U.S. PATENT DOCUMENTS

| 4,701,016 A | 10/1987 | Gartside, III et al. |
| 4,839,970 A | 6/1989 | Goetze et al. |

(Continued)

FOREIGN PATENT DOCUMENTS

| JP | S62-501587 A | 6/1987 |
| JP | H02-118608 A | 5/1990 |

(Continued)

OTHER PUBLICATIONS

WIPO, Japanese International Search Authority, International Search Report (with English translation) and Written Opinion dated May 21, 2019 in International Patent Application No. PCT/JP2019/009481, 9 pages.

(Continued)

*Primary Examiner* — Jerry M Blevins
(74) *Attorney, Agent, or Firm* — Masuvalley & Partners

(57) ABSTRACT

Provided is an optical fiber ribbon and an optical fiber cable, which are adaptable to manufacture at a high velocity, in the intermittent connecting type optical fiber ribbon obtained by adhering and connecting adjacent colored optical fibers by intermittent connecting portions. In an optical fiber ribbon 2 of the present invention, since, in addition to polyol having a weight average molecular weight in a specific range, rheology control agent is contained in a specific range in a material forming an intermittent connecting portion 3, the Newtonian region between a low shear rate region and a high shear rate region of the material forming the intermittent connecting portion 3 can be adjusted. Thus, scattering of the material due to a centrifugal force generated by rotation of an application roll that applies the material at the time of manufacture and the like can be suppressed, and the application amount to colored optical fiber 1 can be stabilized. In addition, the optical fiber ribbon 2 can maintain suppression (Continued)

of such scattering and the like even in the manufacture at a high linear velocity.

7 Claims, 10 Drawing Sheets

(58) Field of Classification Search
USPC ......................................................... 385/114
See application file for complete search history.

(56) References Cited

U.S. PATENT DOCUMENTS

| | | | |
|---|---|---|---|
| 5,373,578 A | | 12/1994 | Parker et al. |
| 5,949,940 A | * | 9/1999 | Botelho ............... G02B 6/4403 |
| | | | 385/114 |
| 2007/0122093 A1 | * | 5/2007 | Chien .................. G02B 6/4482 |
| | | | 385/114 |
| 2008/0181565 A1 | * | 7/2008 | Arashitani ............... G02B 6/14 |
| | | | 385/114 |
| 2016/0299305 A1 | * | 10/2016 | Fabian ................. G02B 6/4495 |
| 2017/0242209 A1 | * | 8/2017 | Tachibana .......... G02B 6/02395 |
| 2017/0276891 A1 | | 9/2017 | Esseghir et al. |
| 2018/0273427 A1 | | 9/2018 | Tanaka et al. |

FOREIGN PATENT DOCUMENTS

| | | | |
|---|---|---|---|
| JP | H03-256013 A | 11/1991 | |
| JP | 2001-264604 A | 9/2001 | |
| JP | 5149230 B2 | 7/2012 | |
| JP | 5117519 B2 | 1/2013 | |
| JP | 2016-133606 A | 7/2016 | |
| JP | 6169060 B2 | 7/2017 | |
| JP | 2017-156558 A | 9/2017 | |
| WO | WO2017-094560 A1 | 6/2017 | |
| WO | WO-2017094560 A1 * | 6/2017 | ........... C03C 25/104 |

OTHER PUBLICATIONS

WIPO, Japanese International Search Authority, Written Opinion dated May 21, 2019 in International Patent Application No. PCT/JP2019/009481 in English, 2 pages.
EP, Extended European Search Report dated Jun. 23, 2021 in European Application No. 19763798.6, 7 pages.

* cited by examiner

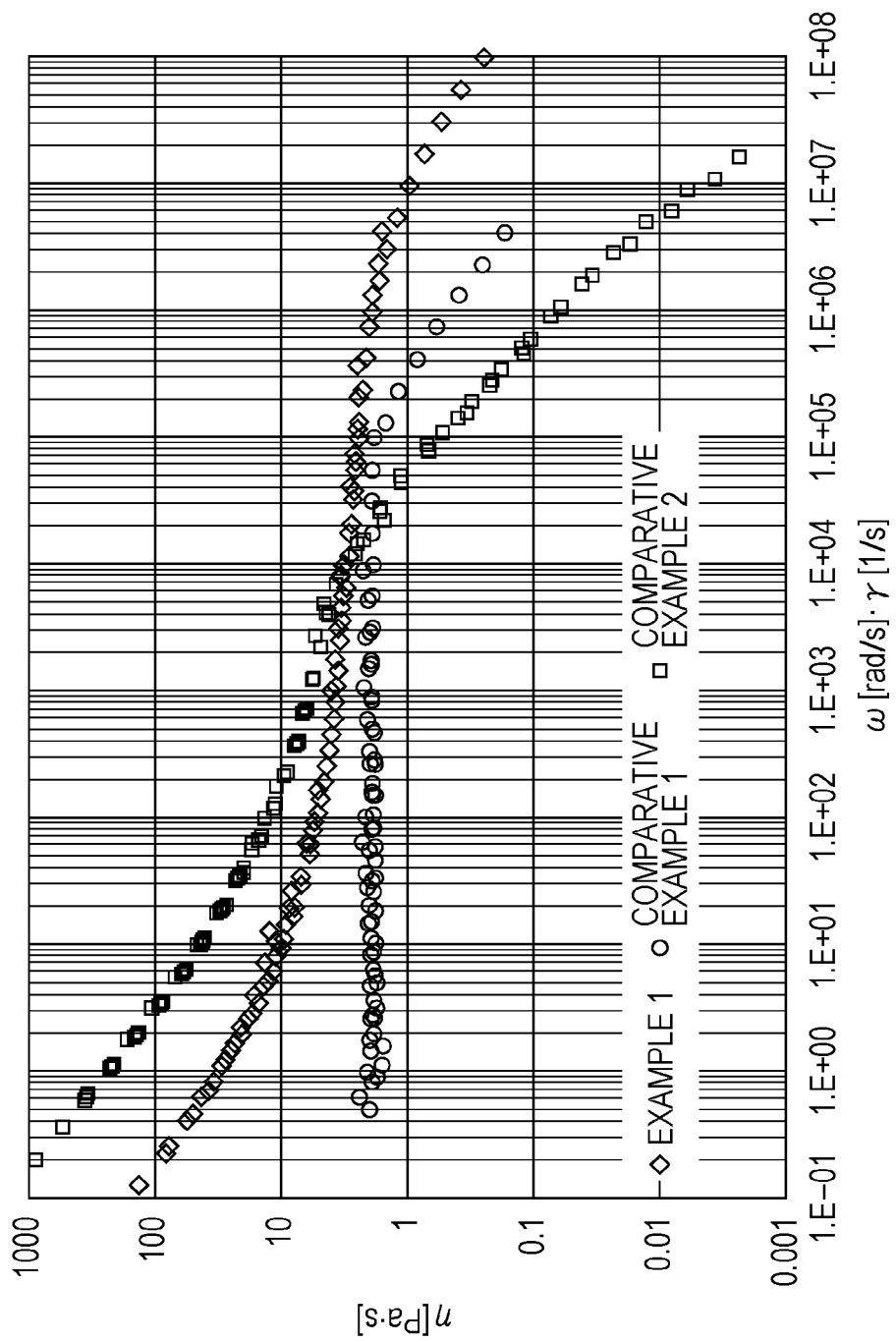

OPTICAL FIBER RIBBON AND OPTICAL FIBER CABLE

RELATED APPLICATIONS

This application is a bypass continuation of and claims priority to International Patent Application No. PCT/JP2019/009481, International Filing Date Mar. 8, 2019, entitled Optical Fiber Ribbon And Optical Fiber Cable; which claims benefit of Japanese Application No. 2018-041422 filed Mar. 8, 2018; both of which are incorporated herein by reference in their entireties.

TECHNICAL FIELD

The present invention relates to an optical fiber ribbon and an optical fiber cable. More specifically, the present invention relates to an optical fiber ribbon obtained by intermittently adhering and connecting adjacent colored optical fibers by intermittent connecting portions in the length direction and the tape width direction, and to an optical fiber cable including the optical fiber ribbons.

BACKGROUND ART

In recent years, the amount of communication has been increasing due to the diversification of information. Therefore, so-called data centers and the like specialized in installing and operating various computers and devices such as data communication have been additionally provided to various places. Accordingly, optical fiber cables are also required to be reduced in diameter and increased in density.

Therefore, in order to reduce the diameter and increase the density of optical fiber cables, various optical fiber ribbons have been proposed. For example, there has been provided an optical fiber ribbon in which adjacent optical fibers are intermittently connected in the longitudinal direction, and connecting portions that are adjacent in the tape width direction are alternately arranged so as not to overlap with each other (see, for example, Patent Literature 1).

Here, in the optical fiber ribbon, a plurality of optical fibers (colored optical fibers) in which a protective coating is applied to the optical fiber with ultraviolet curable resin or the like are planarly arranged, and are connected and integrated by connecting portions made of ultraviolet light curable resin or the like. By intermittently connecting adjacent colored optical fibers in the longitudinal direction to form a ribbon, it is easy to change the shape when bundling a plurality of ribbons, so that it is possible to reduce the diameter and increase the density of the optical fiber cable.

As an application measure for intermittently adhering the colored optical fibers, there have been proposed a measure for ejecting and adhering them with a dispenser (see, for example, Patent Literature 2 and the like), and a measure using a shutter mechanism (see, for example, Patent Literature 3 and the like). Further, there has also been proposed a method in which colored optical fibers are adhered by bringing them into contact with an application roll (see, for example, Patent Literature 4 and the like).

CITATION LIST

Patent Literatures

Patent Literature 1: JP 5117519 B2
Patent Literature 2: JP 2001-264604 A
Patent Literature 3: JP 5149230 B2
Patent Literature 4: JP 6169060 B2

SUMMARY OF INVENTION

Technical Problem

Here, in order to obtain an optical fiber ribbon in which colored optical fibers are intermittently adhered at an optional interval, it is required to synchronize the colored optical fibers and an operation of applying resin between the colored optical fibers. Therefore, when the optical fiber ribbon is manufactured at a high linear velocity (for example, a linear velocity of 200 m/min or more as the linear velocity of the colored optical fiber, the same applies hereinafter), the influence of the viscosity at the time of applying the resin and the easiness of wear of the resin is great.

However, in the method disclosed in Patent Literature 2 described above, the operation by the dispenser has a limit, and the linear velocity is limited to 15 to 100 m/min, so that manufacture at a high velocity is difficult. In addition, even when the shutter mechanism as disclosed in Patent Literature 3 is used, the linear velocity is limited by the shutter operation. When the transfer from the rotating body as in Patent Literature 4 is used, the resin adhered to the surface of the rotating body is scattered by the centrifugal force generated due to the rotation, and there is a problem that the application amount to the colored optical fiber is not stabilized. In addition, the influence is more noticeable at the time of manufacture at a high linear velocity.

The present invention has been made in view of the above problems, and provides an optical fiber ribbon and an optical fiber cable, which are adaptable to manufacture at a high velocity, in the intermittent connecting type optical fiber ribbon obtained by adhering and connecting adjacent colored optical fibers by intermittent connecting portions.

Solution to Problem

In order to solve the above problems, according to the present invention, there is provided an optical fiber ribbon in which colored optical fibers in which at least two coating layers that coat an optical fiber are formed around the optical fiber, and an outermost layer of the coating layers is colored are arranged in parallel, and the adjacent colored optical fibers are connected by intermittent connecting portions in a length direction, in which the intermittent connecting portion contains polyol having a weight average molecular weight of 2,500 to 4,000, and in which rheology control agent that shifts the Newtonian region between a low shear rate region and a high shear rate region to the high shear region side is contained in an amount of 1 to 10% by mass with respect to the whole intermittent connecting portion.

In the optical fiber ribbon according to the present invention, in the above-mentioned present invention, the intermittent connecting portion contains the polyol in an amount of 4 to 30% by mass with respect to the whole intermittent connecting portion.

In the optical fiber ribbon according to the present invention, in the above-mentioned present invention, the rheology control agent is hydrophobic fumed silica.

In the optical fiber ribbon according to the present invention, in the above-mentioned present invention, regarding a viscosity of a material forming the intermittent connecting portion, a viscosity at a shear rate of $10^1$ 1/s determined from a dynamic viscoelasticity at 25° C. is 3 to 11 Pa·s, and a viscosity at a shear rate of $10^6$ 1/s determined from the dynamic viscoelasticity at 25° C. is 0.2 to 2.5 Pa·s.

In the optical fiber ribbon according to the present invention, in the above-mentioned present invention, a ratio of the viscosity at a shear rate of $10^1$ 1/s determined from the dynamic viscoelasticity at 25° C. to the viscosity at a shear rate of $10^1$ 1/s determined from the dynamic viscoelasticity at 35° C. (the viscosity at 25° C./the viscosity at 35° C.) is 3 or less.

In the optical fiber ribbon according to the present invention, in the above-mentioned present invention, an adhesive strength between the colored optical fiber and the intermittent connecting portion is 0.07 N or more.

An optical fiber cable according to the present invention includes the above-described optical fiber ribbon of the present invention.

Advantageous Effects of Invention

The optical fiber ribbon according to the present invention, in addition to the polyol having a weight average molecular weight of 2,500 to 4,000, the rheology control agent is contained in a specific range in the material forming the intermittent connecting portion (ultraviolet curable resin composition). With such a configuration, the material forming the intermittent connecting portion has a relatively high viscosity in the low shear rate region and a relatively low viscosity in the high shear rate region, with respect to the material, whereas shear thinning is shifted to a shear rate region higher than $10^6$ 1/s which is a high shear rate region, and the property of lengthening the Newtonian region can be maintained. Thus, scattering of the material due to a centrifugal force generated by rotation of an application roll that applies the material at the time of manufacture and the like can be suppressed, and the application amount to the colored optical fiber can be stabilized. In addition, the optical fiber ribbon and the optical fiber cable including the colored optical fibers can maintain suppression of such scattering and the like even in the manufacture at a high velocity.

BRIEF DESCRIPTION OF DRAWINGS

FIG. 14 is a diagram showing the relationship between the shear rate and the viscosity.

DESCRIPTION OF EMBODIMENTS

Hereinafter, one aspect of the present invention will be described. An optical fiber ribbon 2 according to the present invention is configured as follows. colored optical fibers 1 in which at least two coating layers that coat an optical fiber 10 are formed around the optical fiber 10, and the outermost layer of the coating layers is colored are arranged in parallel, and the adjacent colored optical fibers 1 are intermittently connected by intermittent connecting portions 3 in the length direction.

Figure 1:
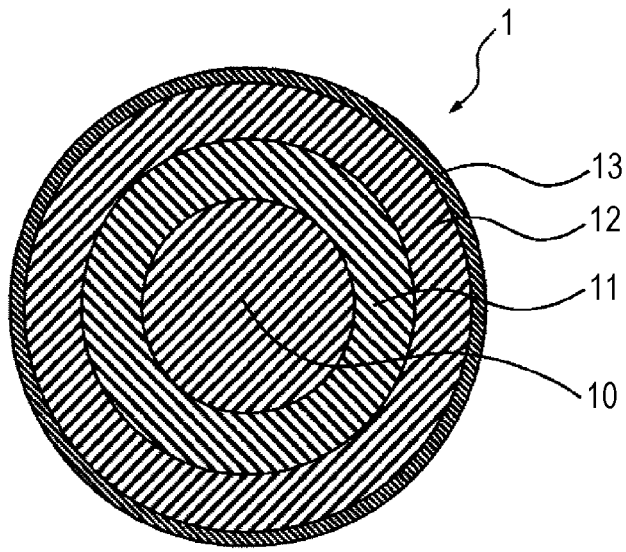
FIG. 1 is a cross-sectional view showing an example of the structure of a colored optical fiber.
Figure 2:
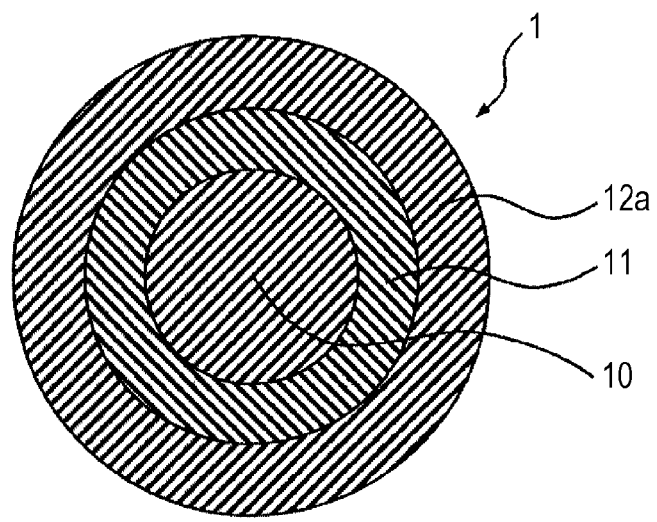
FIG. 2 is a cross-sectional view showing another example of the structure of the colored optical fiber.

(I) Structure of Colored Optical Fiber 1:

First, one aspect of the colored optical fiber 1 that constitutes the optical fiber ribbon 2 will be described. FIG. 1 is a cross-sectional view showing an example of the structure of the colored optical fiber 1. Further, FIG. 2 is a cross-sectional view showing another example of the structure of the colored optical fiber 1. In FIG. 1 and FIG. 2, reference symbol 1 denotes the colored optical fiber, reference symbol 10 denotes the optical fiber, reference symbol 11 denotes a primary coating layer, reference symbol 12 denotes a secondary coating layer, reference symbol 12a denotes a colored secondary coating layer (only in FIG. 2), and reference symbol 13 denotes a colored layer (only in FIG. 1).

In the configuration of FIG. 1, the primary coating layer 11 (primary layer) around the optical fiber 10 such as a glass optical fiber, the secondary coating layer 12 (secondary layer) around the primary coating layer 11, and the colored layer 13 colored around the secondary coating layer 12 are formed in the stated order to constitute the colored optical fiber 1. Further, the colored layer 13 is the outermost layer of the colored optical fiber 1.

On the other hand, in the configuration of FIG. 2, the primary coating layer 11 around the optical fiber 10, and the secondary coating layer 12a colored around the primary coating layer 11 are formed in the stated order to obtain the colored optical fiber 1. Further, the colored secondary coating layer 12a is the outermost layer of the colored optical fiber 1. In the following description, the colored layer 13 that is the outermost layer of the colored optical fiber 1 and the colored secondary coating layer 12a may be collectively referred to as the colored layer 13 and the like.

Figure 3:
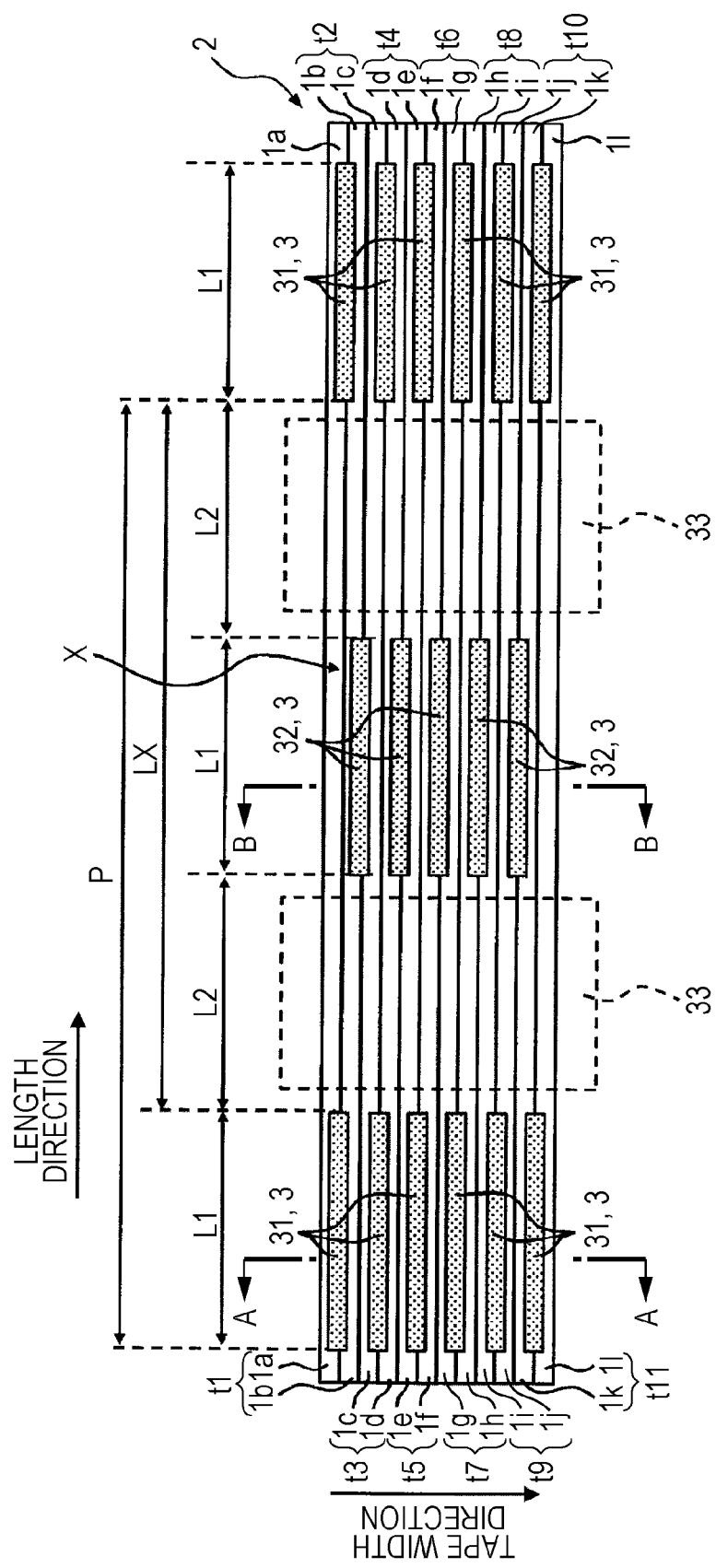
FIG. 3 is a front view showing one aspect of an optical fiber ribbon.
Figure 4:
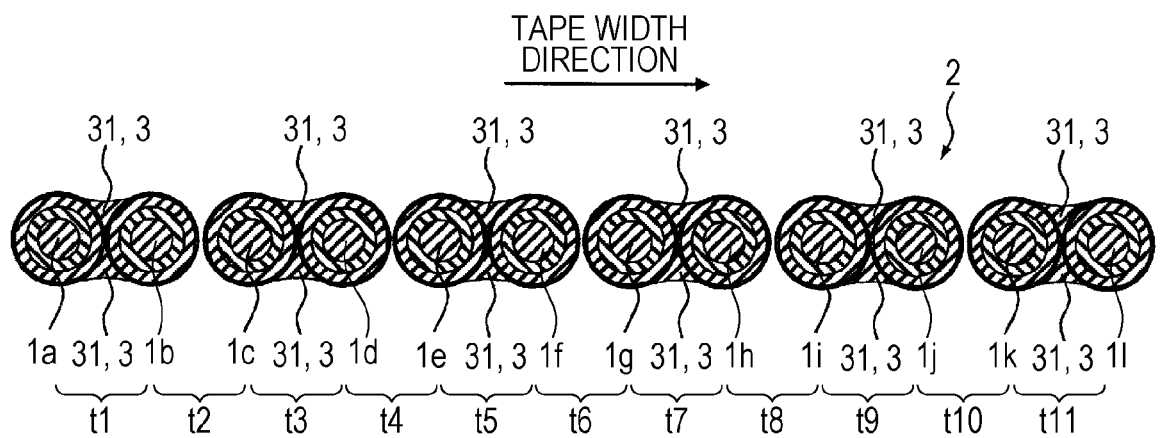
FIG. 4 is a view showing a connected state in the optical fiber ribbon.
Figure 5:
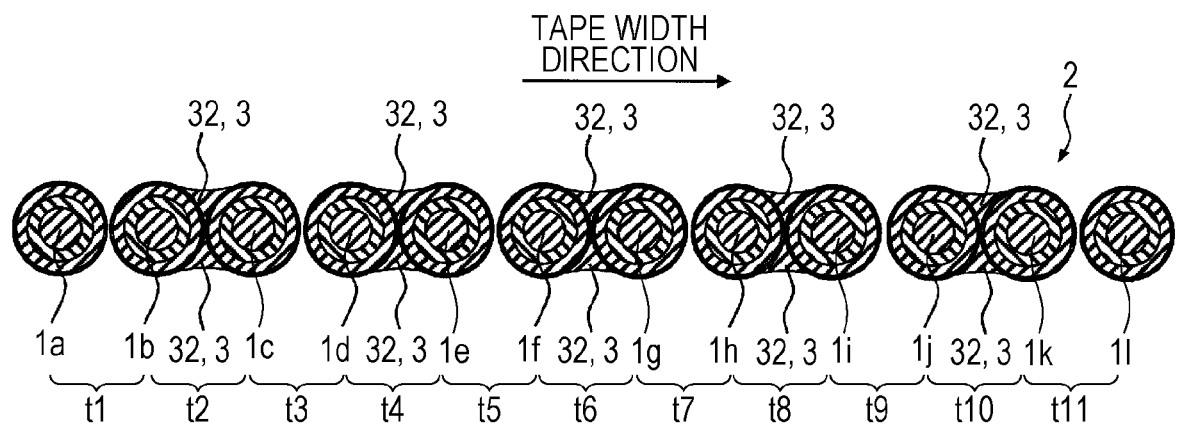
FIG. 5 is a view showing a connected state in the optical fiber ribbon.

(II) Structure of Optical Fiber Ribbon 2:

FIG. 3 is a front view showing one aspect of the optical fiber ribbon 2. FIG. 4 and FIG. 5 are views showing the connected state in the optical fiber ribbon 2 (FIG. 4 is a sectional view taken along the line A-A in FIG. 3 including intermittent connecting portions 31 and FIG. 5 is a sectional view taken along the line B-B in FIG. 3 including intermittent connecting portions 32). In FIG. 3 to FIG. 5, for convenience, the optical fiber ribbon 2 including twelve colored optical fibers 1 is shown.

As shown in FIGS. 3 to 5, the intermittent connecting type optical fiber ribbon 2 is obtained by intermittently connecting the adjacent colored optical fibers 1 arranged in parallel by the intermittent connecting portions 3 (also called intermittent type connecting portions) in the length direction. By providing the connecting portions (intermittent connecting portions 3) intermittently on the colored optical fibers 1 arranged in parallel, the colored optical fibers 1 can be connected and integrated.

In the optical fiber ribbon 2 including twelve cores shown in FIG. 3, one set of a colored optical fiber pair t1 consisting of a colored optical fiber 1a and a colored optical fiber 1b are intermittently connected by the intermittent connecting portions 31 in the length direction (see FIG. 3). In the colored optical fiber pair t1, the adjacent intermittent connecting portions 31 can be provided at equal intervals, and the lengths of the intermittent connecting portions 31 can be made equal. The above similarly applies to a colored optical fiber pair t3 consisting of a colored optical fiber 1c and a colored optical fiber 1d, a colored optical fiber pair t5 consisting of a colored optical fiber 1e and a colored optical fiber 1f, a colored optical fiber pair t7 consisting of a colored optical fiber 1g and a colored optical fiber 1h, a colored optical fiber pair t9 consisting of a colored optical fiber 1i and a colored optical fiber 1j, and a colored optical fiber pair t11 consisting of a colored optical fiber 1k and a colored optical fiber 1l.

In these six sets of the colored optical fiber pairs t1, t3, t5, t7, t9, and t11 the intermittent connecting portions 31 are provided so that the arrangements in the tape width direction are the same (see FIG. 3). Therefore, non-connecting portions (portions each having a single core without formation of the intermittent connecting portion 3 (single core portions) and surrounded by the dotted line in FIG. 3) 33 of six sets of the colored optical fiber pairs t1, t3, t5, t7, t9, and t11 are located at positions that coincide with each other as viewed from the tape width direction.

Further, a colored optical fiber pair t2 consisting of the colored optical fiber 1b and the colored optical fiber 1c are also intermittently connected by the intermittent connecting portions 32 in the length direction. The adjacent intermittent connecting portions 32 can be provided at equal intervals, and the lengths of the intermittent connecting portions 32 can be made equal. The above similarly applies to a colored optical fiber pair t4 consisting of the colored optical fiber 1d and the colored optical fiber 1e, a colored optical fiber pair t6 consisting of the colored optical fiber 1f and the colored optical fiber 1g, a colored optical fiber pair t8 consisting of the colored optical fiber 1h and the colored optical fiber 1i, and a colored optical fiber pair t10 consisting of the colored optical fiber 1j and the colored optical fiber 1k.

In these five sets of the colored optical fiber pairs t2, t4, t6, t8, and t10, the intermittent connecting portions 32 are provided so that the arrangements in the tape width direction are the same. Therefore, also the non-connecting portions 33 of the five sets of the colored optical fiber pairs t2, t4, t6, t8, and t10 are located at positions that coincide with each other as viewed from the tape width direction.

As described above, in the intermittent connecting type optical fiber ribbon 2, regarding the adjacent two cores (two wires) of the colored optical fibers 1, the intermittent connecting portions 31 and 32 and the non-connecting portions 33 are formed so as to be alternately arranged with a predetermined length, and the adjacent colored optical fibers 1 are intermittently connected by the intermittent connecting portions 3 in the length direction (see, for example, the colored optical fiber pair t1 consisting of the colored optical fiber 1a and the colored optical fiber 1b, the colored optical fiber pair t2 consisting of the colored optical fiber 1b and the colored optical fiber 1c, and the like shown in FIG. 3).

In addition, in the tape width direction, as shown in FIG. 3 to FIG. 5, both sides (outer sides) in the tape width direction of the colored optical fiber pairs t1 to t11 each consisting of the adjacent two cores (two wires) with the intermittent connecting portions 31 and 32 formed thereon in the part in which the intermittent connecting portions 3 are formed are not connected (for example, the intermittent connecting portions 31 that connect the two cores of the colored optical fibers 1c and 1d are formed on the colored optical fiber pair t3 consisting of the colored optical fiber 1c and the colored optical fiber 1d shown in FIG. 4, whereas both sides (outer sides) in the tape width direction in the part in which the intermittent connecting portions 3 are formed are not connected).

For example, in the case of one including twelve cores shown in FIG. 3, a length L1 of the intermittent connecting portions 31 and 32 in the optical fiber ribbon 2 is preferably approximately 5 to 35 mm, and a length L2 of the non-connecting portion 33 is preferably approximately 5 to 15 mm. Further, a pitch P in the optical fiber ribbon 2 (it indicates a length from the intermittent connecting portion 31 to the intermittent connecting portion 31 (or from the intermittent connecting portion 32 to the intermittent connecting portion 32), which are adjacent in the length direction, in FIG. 3, it is from the intermittent connecting portion 31 to the intermittent connecting portion 31) is preferably 100 mm or less, and more preferably approximately 20 to 90 mm, but is not particularly limited to this range.

Since FIG. 3 shows the configuration in which the intermittent connecting portions 3 are formed at positions that coincide with each other when viewed from the tape width direction, the non-connecting portions 33 are also formed at positions that coincide with each other when viewed from the tape width direction. On the other hand, the non-connecting portion indicates a portion having a single core without formation of the intermittent connecting portion 3 (single core portion), and, for example, X shown in FIG. 3 corresponds to a non-connecting portion (a non-connecting portion X having a length of LX). Here, the length LX of the non-connecting portion X in one pair of the colored optical fiber pair (for example, the colored optical fiber pair t1) (a length in the longitudinal direction between the two intermittent connecting portions 31) is preferably approximately 15 to 55 mm, but is not particularly limited to this range.

(III) Intermittent Connecting Portion 3:

The intermittent connecting portion 3 shown in FIG. 3 and the like can be formed by curing the following components, for example. In the present invention, a component constituting the intermittent connecting portion 3 contains polyol having a weight average molecular weight (Mw) of 2,500 to 4,000. The polyol having such a weight average molecular weight (hereinafter, may be simply referred to as "molecular weight") can be present without reacting with a network of ultraviolet curable resin constituting the intermittent connecting portion 3. In the intermittent connecting portion 3, the polyol is swollen in the dense network structure of the ultraviolet curable resin, and plays a role of a plasticizer for the ultraviolet curable resin. As a result, the Young's modulus of the intermittent connecting portion 3 can be made moderate, and the intermittent connecting portion 3 can be provided with flexibility and elongation even under low temperature conditions. Further, the polyol can bleed onto the surface of the intermittent connecting portion 3 to suppress friction between optical fiber units 21.

Further, if the weight average molecular weight of the polyol is within the above range, it is considered that the weight average molecular weight of the polyol is higher than the molecular weight of the colored layer 13 of the colored optical fiber 1, so that the polyol does not pass through the mesh of the colored layer 13 and does not migrate. Moreover, since the molecular weight of the polyol is as large as 2,500 to 4,000, it is possible to control the Young's modulus of the intermittent connecting portion 3 by increasing the content of the polyol. Thus, by allowing the presence of the polyol in the intermittent connecting portion 3, the intermittent connecting portion 3 can be provided with flexibility and elongation even under low temperature conditions, and the polyol can bleed onto the surface of the intermittent connecting portion 3 to suppress friction between the optical fiber units 21.

Examples of the polyol include polypropylene glycol, polyethylene glycol, polytetramethylene glycol, and the like. Among them, those having no branched structure such as polyethylene glycol and polytetramethylene glycol may be crystallized at low temperature, and bending may occur due to the crystallizing at the interface between the colored layer 13 and the intermittent connecting portion 3, which may cause an increase in loss. On the other hand, polypropylene glycol having a branched structure is not crystallized even at a low temperature of −60° C., and the above-mentioned effect of the polyol can be surely exhibited. Therefore, it is preferable to use polypropylene glycol as the polyol. Polypropylene glycol is produced by addition-polymerizing polypropylene oxide (PO) with a polyfunctional alcohol using an alkali catalyst, and ethylene oxide (EO) may be addition-polymerized to enhance the reaction. However, since the hydrophilicity becomes high when ethylene oxide is added, it is preferable to use only polypropylene oxide (PO) as the additional substance.

The weight average molecular weight of the polyol contained in the intermittent connecting portion 3 is 2,500 to 4,000 as described above. When the weight average molecular weight of the polyol is less than 2,500, the polyol may pass through the colored layer 13 in contact with the intermittent connecting portion 3 and migrate. Further, as an optical fiber cable 4, the polyol may migrate to a buffer layer or a coating layer (sheath) of the optical fiber cable in contact with the intermittent connecting portion 3. Due to such migration of the polyol, the above-described effect may not be exhibited.

On the other hand, when the weight average molecular weight of the polyol exceeds 4,000, the viscosity increases when the polyol is mixed with the ultraviolet curable resin. Therefore, the ejection amount when the intermittent connecting portion 3 is applied at the time of manufacture is reduced, which may cause poor adhesion. Further, in order to increase the ejection amount, it is possible to lower the viscosity by increasing the heating temperature, but increasing the heating temperature tends to increase the amount of resin during application, which may increase the thickness of the intermittent connecting portion 3. In addition, stringing may occur at the intermittent connecting portion and a roll portion, which may cause contamination of the surroundings. As the weight average molecular weight of the polyol, there may be employed, for example, a value measured by a method of measuring the molecular weight distribution or average molecular weight distribution of a polymer substance, which is conventionally known, such as gel permeation chromatography (GPC).

The content of the polyol contained in the intermittent connecting portion 3 is preferably 4 to 30% by mass with respect to the whole intermittent connecting portion 3 (the whole components constituting the intermittent connecting portion 3). When the content of the polyol with respect to the whole intermittent connecting portion 3 is less than 4% by mass, the flexibility and elongation at the time of unitization are insufficient, and the risk of cracking of the intermittent connecting portion 3 becomes high when ironing is applied. In addition, the Newtonian region between the low shear rate region and the high shear rate region becomes narrow, and shear thinning may be confirmed before the high shear rate region is reached. That is, the stability in the high shear rate region may be deteriorated, which may lead to scattering of the material during application. Further, when the content exceeds 30% by mass, the viscosity is lowered, which may cause poor application or may cause scattering from the roll. Therefore, the content of the polyol contained in the intermittent connecting portion 3 is preferably 4 to 30% by mass with respect to the whole intermittent connecting portion 3

As other components constituting the intermittent connecting portion 3, for example, it is possible to use ultraviolet curable resin that coats an optical fiber and a component that is generally used as its additive component, and specifically, oligomer, diluent monomer, photoinitiator, silane coupling agent, sensitizer, pigment, filler, and other various additives can be used.

As the oligomer, for example, polyether-based urethane acrylate, epoxy acrylate, polyester acrylate, silicone acrylate, or the like can be used. These may be used alone or in combination of two or more. The Young's modulus and the glass transition temperature (Tg) of the whole intermittent connecting portion 3 can be adjusted by the skeleton structure and molecular weight of the oligomer, and the type and addition amount of the below-described diluted monomer. As will be described later, the Young's modulus can be adjusted by reducing the molecular weight of the oligomer or increasing the functional groups of the monomer.

Further, when polyether-based urethane acrylate is used as the oligomer, for an intermediate block, for example, polyol such as polypropylene glycol, polyethylene glycol, or polytetramethylene glycol can be used. However, it is preferable to use polypropylene glycol having a branched structure. It is preferable to use such oligomer that the polypropylene glycol is used as the intermediate block, and as a skeleton component, a hydroxy compound having an unsaturated double bond having reactivity with ultraviolet rays is bound to hydroxyl groups at both ends thereof through aromatic diisocyanate.

By using polypropylene glycol as the polyol and oligomer having polypropylene glycol as the intermediate block as the oligomer, crystallization does not occur even at a low temperature of −60° C., so that crystallization at low temperature can be efficiently prevented, which is preferable. As the oligomer to be used, it is preferable to use one having a weight average molecular weight of 500 to 2,000, and it is particularly preferable to use one having a weight average molecular weight of 1,000 to 2,000.

As the aromatic isocyanate, for example, aromatic diisocyanate such as tolylene diisocyanate (TDI) or isophorone diisocyanate (IPDI) can be used. As the hydroxy compound, for example, hydroxyethyl acrylate (HEA) or the like can be used.

Since the viscosity may be too high when oligomer is used alone, diluting monomer can be blended mainly for the purpose of adjusting the viscosity within a range not hindering the purpose and effect of the addition of rheology control agent described later. As the diluting monomer, for example, monofunctional monomer, bifunctional monomer, polyfunctional monomer, or the like can be used.

Examples of the diluting monomer that can be added include monofunctional monomers such as PO-modified nonylphenol acrylate, isobornyl acrylate, 2-ethylhexyl acrylate, isononyl acrylate, isodecyl acrylate, polyethylene glycol acrylate, N-vinylpyrrolidone, N-vinylcaprolactam, lauryl acrylate, and the like. Further, examples of the bifunctional monomer and the polyfunctional monomer include 1,6-hexanediol diacrylate, bisphenol A epoxy acrylate, tripropylene glycol diacrylate, tricyclodecane dimethylol diacrylate, EO-modified bisphenol A diacrylate, hexanediol diacrylate, and the like. These may be used alone or can also be used in combination of two or more. Note that, the monofunctional monomer has a large effect of lowering the Young's modulus as compared with the bifunctional monomer and the polyfunctional monomer. This is because the monofunctional monomer has a greater action of reducing the crosslinking points in the molecular structure than the bifunctional monomer and the polyfunctional monomer.

The photoinitiator becomes a radical when it absorbs ultraviolet rays, and can continuously polymerize an unsaturated double bond of reactive oligomer and reactive monomer. As the photoinitiator, for example, 1-hydroxy-cyclohexyl-phenyl-ketone, 2-hydroxy-2-methyl-1-phenyl-propane-1-one, 2,4,6-trimethylbenzoyl-diphenyl-phosphine oxide, bis (2,4,6-trimethylbenzoyl)-phenylphosphine oxide, or the like can be used as alkylphenone photopolymerization initiator or acylphosphine oxide photopolymerization initiator. These may be used alone or can be used in combination of two or more.

As the sensitizer, for example, triplet sensitizers such as thioxanthones and benzophenones are suitable. Particularly, thioxanthone has a long life in the triplet state, thus has a high effect, and can be used in combination.

In the intermittent connecting portion 3 constituting the optical fiber ribbon 2 of the present invention, rheology control agent is added as a constituent component. The rheology control agent has an effect of making the added material (in the present invention, it indicates the ultraviolet curable resin composition constituting the intermittent connecting portion 3) have a relatively high viscosity in the low shear rate region. Further, it has an effect of reducing the inclination with respect to the temperature dependence. Furthermore, in the present study, it is found that the addition of the rheology control agent can shift the shear thinning to a shear rate region higher than the high shear rate region of $10^6$ 1/s to stabilize the application. That is, the rheology control agent can cause the Newtonian region between the low shear rate region and the high shear rate region to be shifted to the high shear region side and impart a property that the Newtonian region becomes longer. In the present invention, the low shear rate region (low shear rate region) refers to, for example, a region of approximately $10^1$ ($=10$) (1/s) or less, and further, a high shear rate region (high shear force region) refers to, for example, a region of approximately $10^6$ ($=1,000,000$) (1/s).

As such rheology control agent that shifts the Newtonian region between the low shear rate region and the high shear rate region to the high shear region side, for example, inorganic or organic fillers such as silica such as fumed silica, titanium oxide, calcium carbonate, ground calcium carbonate, bentonite, and smectite, or liquid components can be used. The rheology control agent may be used alone or in combination of two or more.

As the rheology control agent, it is preferable to use silica such as fumed silica. Further, examples of fumed silica include hydrophobic fumed silica and hydrophilic fumed silica, and it is particularly preferable to use hydrophobic fumed silica. By using the hydrophobic fumed silica, the miscibility becomes good when the rheology control agent is added to the ultraviolet curable resin composition constituting the intermittent connecting portion 3, and the rheology control agent is suitably dispersed in the material. In addition, the material (resin composition) is satisfactorily applied to the front surface and the back surface of the adjacent colored optical fibers 1, and the appearance is improved.

Examples of the hydrophobic fumed silica include AEROSIL (registered trademark, hereinafter, the same applies to "AEROSIL") R974 (manufactured by Nippon Aerosil Co., Ltd.) and the like. Examples of the hydrophilic fumed silica include, for example, AEROSIL 200 (manufactured by Nippon Aerosil Co., Ltd.) and the like.

As the shape of the rheology control agent, in the case of solid, particle, powder, sphere, and the like can be preferably used, and liquid may be used. The average particle size (average primary particle size) is not particularly limited, but is preferably 0.005 μm to 10 μm, more preferably 0.007 μm to 1 μm, and particularly preferably 0.01 μm to 0.1 μm. These average particle size ranges are particularly effective when hydrophobic fumed silica is used as the rheology control agent.

In the present invention, the content of the rheology control agent is 1 to 10% by mass with respect to the whole intermittent connecting portion 3 (the whole components constituting the intermittent connecting portion 3). By adding the rheology control agent in the above content, the Newtonian region between the low shear rate region and the high shear rate region of the ultraviolet curable resin composition constituting the intermittent connecting portion 3 can be adjusted. That is, regarding the viscosity of the ultraviolet curable resin composition, the viscosity at a shear rate of $10^1$ 1/s determined from the dynamic viscoelasticity at 25° C. (assuming a low shear rate region) can be set within the range of 3 to 11 Pa·s, and the viscosity at a shear rate of $10^6$ 1/s (assuming a high shear rate region) determined from the dynamic viscoelasticity at 25° C. can be set within the range of 0.2 to 2.5 Pa·s. The position of shear thinning can be shifted as compared with the case where the rheology control agent is not added.

On the other hand, if the content of the rheology control agent is less than 1% by mass, the rheology may be insufficiently adjusted, and the viscosity may not fall within the above range. When the content exceeds 10% by mass, the application amount when the material is applied between the colored optical fibers 1 by an application roll is reduced, and a problem may occur that the close-contact force between the colored optical fibers 1 decreases.

Here, the advantage of keeping the viscosity at a shear rate of $10^1$ 1/s determined from the dynamic viscoelasticity at 25° C. (assuming a low shear rate region) within the range of 3 to 11 Pa·s, and the viscosity at a shear rate of $10^6$ 1/s (assuming a high shear rate region) determined from the dynamic viscoelasticity at 25° C. within the range of 0.2 to 2.5 Pa·s will be described with reference to FIG. 6.

Figure 6:
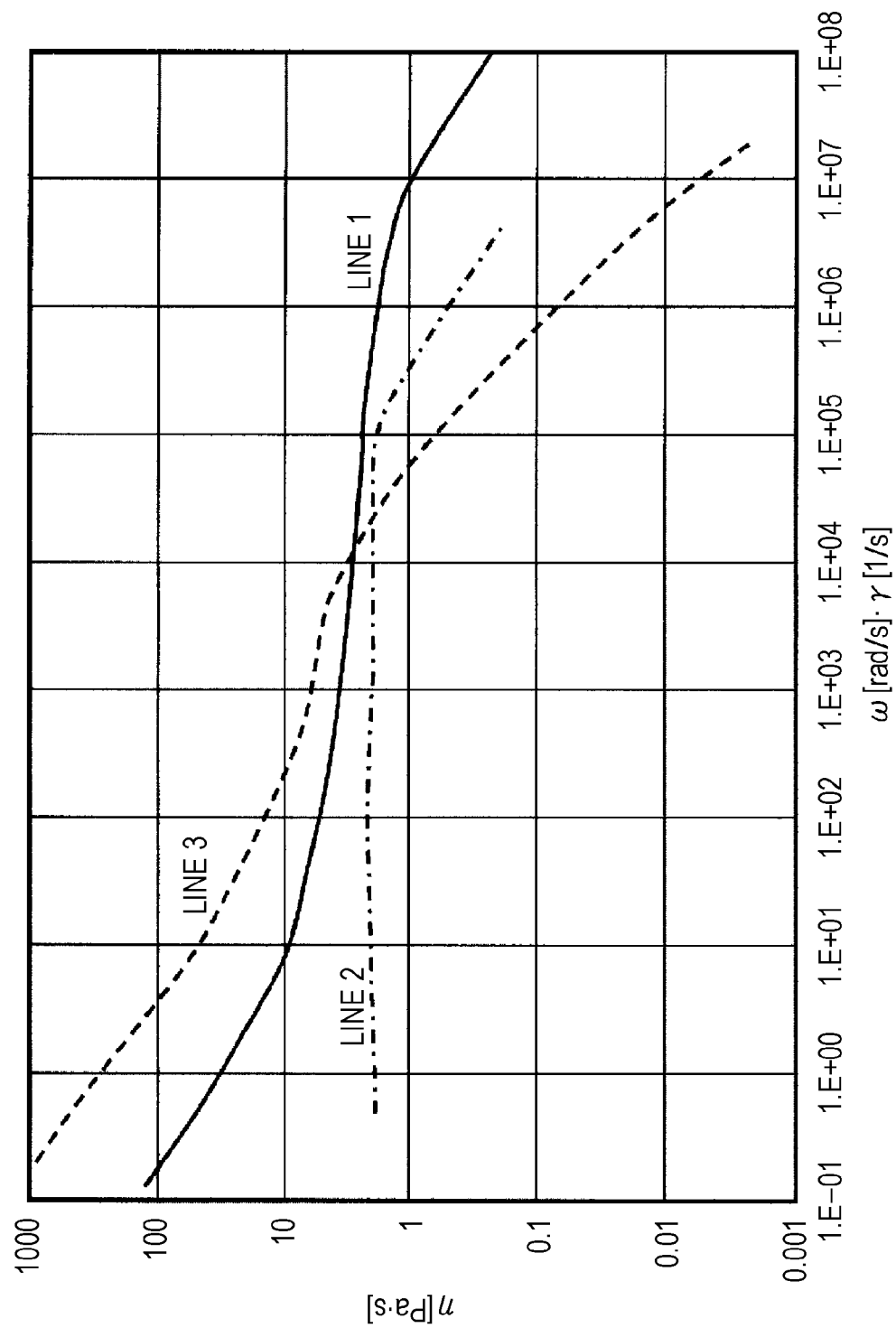
FIG. 6 is a diagram showing an example of the relationship between the shear rate and the viscosity.

FIG. 6 is a diagram showing an example of the relationship between the shear rate and the viscosity. The vertical axis represents a viscosity η (Pa·s), and the horizontal axis represents a shear rate γ (1/s). As will be described later, the shear rate γ (1/s) is equivalent to a frequency ω (rad/s). The line 1 is a curve showing the behavior of a fluid having a viscosity satisfying the requirements of the present invention regarding the contents of the polyol and the rheology control agent. The line 1 maintains the viscosity at a shear rate of $10^1$ 1/s in the range of 3 to 11 Pa·s and maintains the viscosity at a shear rate of $10^6$ 1/s in the range of 0.2 to 2.5 Pa·s. In this way, the shear thinning can be shifted to a shear rate region higher than $10^6$ 1/s, so that the Newtonian region becomes long. Therefore, the viscosity change in the high shear rate region with respect to the low shear rate region can be suppressed to be small, so that the scattering of the material due to the application roll and the like can be suppressed even in the manufacture at a high linear velocity, and the application amount of the material can be stabilized.

As a result, the material forming the intermittent connecting portion 3 is suitably applied to the colored optical fibers 1.

On the other hand, the line 2 corresponds to, for example, a case where the rheology control agent is not added to the requirements of the present invention. In this case, shear thinning in which the viscosity decreases at a shear rate lower than $10^6$ (for example, $10^5$ 1/s etc.) is confirmed, and it is considered that the behavior becomes unstable in the high shear rate region. The line 3 corresponds to, for example, a case where the polyol is not added, the Newtonian region is narrow, and shear thinning is also confirmed at a shear rate lower than $10^6$ 1/s (for example, $10^4$ 1/s etc.). This is also considered that the behavior becomes unstable in the high shear rate region. It is considered that it is difficult for any of these to suppress scattering and the like during application of the material by the application roll.

The viscosity from the low shear rate region to the high shear rate region of the material forming the intermittent connecting portion 3 can be measured using a commercially available viscosity measuring device (rheometer), and, for example, Rheometer MCR301 (Manufactured by Anton Paar) and the like can be used.

Further, in order to obtain the relationship between the shear rate and the viscosity shown in FIG. 6, for example, first, frequency dispersion (relationship between the frequency and the viscosity) is determined using conditions of 25φ parallel plate, gap 0.5 mm, frequency 62.8 to 0.68 rad/s (10 to 0.1 Hz log 4 points/digit 9 points in total), strain amount 5%, temperature −50° C. to 50° C. (in increments of 10° C.), and the like.

Then, using the WLF formula (Williams, Landel, Ferry) for the relationship between ω, η, and δ at the reference temperature (for example, 25° C. which is the temperature at which the material forming the intermittent connecting portion 3 is applied), a shift factor LogαT that indicates the relationship between the horizontal movement amount and the temperature change is defined, and a master curve is determined (see, for example, FIG. 13 to be described later). From the Cox-Merz rule, the frequency ω (rad/s) and the shear rate γ (1/s) can be treated as being equivalent, and hence the frequency may be converted from Hz→rad/s→shear rate γ (1/s) for obtainment.

In addition, it is further preferable that, in the above viscosity range, the viscosity at a shear rate of $10^1$ 1/s determined from the dynamic viscoelasticity at 25° C. be within the range of 5 to 11 Pa·s and the viscosity at a shear rate of $10^6$ 1/s determined from the dynamic viscoelasticity at 25° C. be within the range of 0.4 to 2.4 Pa·s.

Further, as the temperature dependence of the viscosity of the resin material (the relationship between the viscosities at 25° C. and 35° C.), it is preferable that the ratio of the viscosity at a shear rate of $10^1$ 1/s determined from the dynamic viscoelasticity at 25° C. to the viscosity at a shear rate of $10^1$ 1/s determined from the dynamic viscoelasticity at 35° C. (the viscosity at 25° C./the viscosity at 35° C.) be 3 or less. By setting the rate of the viscosities to 3 or less, the influence of shear heat generation is small. On the other hand, if such a ratio of viscosities is exceeded, the influence of shear heat generation is large, and the viscosity change becomes larger, so that it is particularly preferable that the ratio of the viscosities (the viscosity at 25° C./the viscosity at 35° C.) be 2 or less.

In order to obtain such a ratio of the viscosities, it is preferable that the viscosity at a shear rate of $10^1$ 1/s determined from the dynamic viscoelasticity at 35° C. be within the range of 1.5 to 6 Pa·s.

The adhesive strength between the colored optical fiber 1 and the intermittent connecting portion 3 is preferably 0.07 N or more. When the adhesive strength is within such a range, the above-described effects are efficiently exhibited, and the colored optical fiber 1 and the intermittent connecting portion 3 are appropriately adhered (held in close contact). The adhesive strength is more preferably 0.07 to 0.25 N, further preferably 0.07 to 0.20 N, and particularly preferably 0.07 to 0.15 N. As long as the adhesive strength is within such a range, the colored optical fiber 1 and the intermittent connecting portion 3 are appropriately adhered (held in close contact), and the separability (workability) of the colored optical fiber 1 can be maintained.

Such adhesive strength is ensured by the adhesive surface at the interface between the colored optical fiber 1 and the resin forming the intermittent connecting portion 3. Generally, the application amount of resin to the intermittent connecting portion 3 is controlled by the resin pressure at the time of manufacture (which is the same meaning as the application pressure, the same applies hereinafter), and it is considered that the adhesive strength becomes smaller as the amount of resin of the intermittent connecting portion 3 becomes smaller (the adhesive surface becomes smaller). If the resin is applied so as to be higher than the colored optical fiber 1, there may be caused a problem that, when the optical fiber ribbons 2 are folded and densified to form a cable, the adjacent optical fiber ribbons 2 hit against each other to cause a macrobend (increased transmission loss) or the intermittent connecting portion 3 cracks.

Further, if the adhesive strength is too high, the separability (workability) cannot be ensured. Thus, by applying the resin forming the intermittent connecting portion 3 to an extent not exceeding the height between the two colored optical fibers 1, macrobend can be suppressed, which is preferable.

The adhesive strength and the separability (workability) are often affected by the length of the interface at which the single colored optical fiber 1 and the intermittent connecting portion 3 are held in contact (the length of the adhesive portion) and the like. The length of the adhesive portion is appropriately determined depending on the material forming the intermittent connecting portion 3, the shape of the intermittent connecting portion 3, and the like, and the length is preferably approximately 5 to 35 mm. If the length of the adhesive portion is within such a range, good adhesive strength and separability (workability) can be ensured at the same time.

In order to keep the adhesive strength between the colored optical fiber 1 and the intermittent connecting portion 3 within the above range, the above-mentioned or later-described material or the like is used as the intermittent connecting portion 3, and the kind of the material or the like is appropriately selected. Then, the resin pressure of the resin, the length of the adhesive portion, conditions of the ultraviolet curing such as the irradiation amount, and the like are adjusted.

The adhesive strength between the colored optical fiber 1 and the intermittent connecting portion 3 can be measured as follows, for example. The two colored optical fibers 1 on which the intermittent connecting portion 3 is formed are taken out, the colored optical fibers 1 are fixed to an upper part of a tensile tester, a wire of φ0.5 mm is passed between the two colored optical fibers 1, the wire is moved downward at a velocity of 100 mm/min and the strength (N) required to peel the colored optical fibers 1 from the intermittent connecting portion 3 is measured, and the measured value may be regarded as the adhesive strength between the colored optical fiber 1 and the intermittent connecting portion 3.

In addition to the above-mentioned components, to the resin material (ultraviolet curable resin composition) forming the intermittent connecting portion 3, the following additives, for example, antioxidant, ultraviolet absorber, light stabilizer such as hindered amine light stabilizer, deterioration inhibitor such as thermal polymerization inhibitor, silane coupling agent, leveling agent, hydrogen absorbing agent, chain transfer agent, silicone, lubricant, and the like may be added as necessary within a range that does not impair the objects and effects of the present invention.

Moreover, the intermittent connecting portion 3 may be colored. Examples of the pigment added when the intermittent connecting portion 3 is colored include organic pigments such as phthalocyanine, quinacridone, dioxazine, and benzimidazole, and inorganic pigments such as carbon black and titanium oxide. As the coloring material, a coloring material in which pigment and ultraviolet curable resin represented by the above-mentioned materials are mixed may be used. The content of the coloring material may be appropriately determined depending on the material forming the intermittent connecting portion 3, the content of the pigment contained in the coloring material, and the type of the component of the ultraviolet curable resin and the like, and the content of the coloring material is preferably 0.5 to 3.0% by mass, and particularly preferably 1.5 to 2.5% by mass with respect to the whole intermittent connecting portion 3. By coloring the intermittent connecting portion 3, when the optical fiber ribbon 2 is manufactured, it is possible to continuously confirm the adhesion between the intermittent connecting portion 3 and the optical fiber ribbon 2 in the manufacture line.

(IV) Primary Coating Layer 11, Secondary Coating Layer 12, Colored Secondary Coating Layer 12a and Colored Layer 13:

As the resin material as the constituent material of the primary coating layer 11 (primary layer) and the secondary coating layer 12 (secondary layer) of the colored optical fiber 1 according to the present invention, and the constituent material of the colored layer 13 of the colored optical fiber 1, the ultraviolet curable resin mentioned above as the components constituting the intermittent connecting portion 3 and its additives, for example, oligomer, diluting monomer, photoinitiator, silane coupling agent, sensitizer, pigment (and the coloring material in which pigment and the ultraviolet curable resin are mixed), lubricant, and the components of the various additives described above can be preferably used.

As the oligomer, for example, as the primary coating layer 11 and the secondary coating layer 12, similarly to the one forming the intermittent connecting portion 3 described above, it is preferable to use oligomer in which aromatic isocyanate and hydroxyethyl acrylate are added to polyol using polypropylene glycol, and the Young's modulus can be adjusted by changing the molecular weight of the polyol (polypropylene glycol) of the intermediate block. The weight average molecular weight of the oligomer used is preferably 1,000 to 4,000 when the oligomer is used as the primary coating layer 11, is preferably 500 to 2,000 when the oligomer is used as the secondary coating layer 12, is preferably 500 to 2,000 when the oligomer is used as the colored layer 13, and is preferably 500 to 2,000 when the oligomer is used as the colored secondary coating layer 12a.

Specifically, as the primary coating layer 11 and the secondary coating layer 12, by using polypropylene glycol as the polyol and oligomer having polypropylene glycol as the intermediate block as the oligomer, crystallization does not occur even at a low temperature of −60° C., so that crystallization at low temperature can be efficiently prevented. As the aromatic isocyanate, for example, aromatic diisocyanate such as tolylene diisocyanate (TDI) or isophorone diisocyanate (IPDI) can be used. As the hydroxy compound, for example, hydroxyethyl acrylate (HEA) or the like can be used. Since the viscosity of the oligomer alone may be too high, diluting monomer can be blended mainly for the purpose of adjusting the viscosity. As the diluting monomer, for example, monofunctional monomer, bifunctional monomer, polyfunctional monomer, or the like can be used. Examples of the diluting monomer that can be added include monofunctional monomers such as PO-modified nonylphenol acrylate, isobornyl acrylate, 2-ethylhexyl acrylate, isononyl acrylate, isodecyl acrylate, polyethylene glycol acrylate, N-vinylpyrrolidone, N-vinylcaprolactam, and the like. Further, examples of the bifunctional monomer and the polyfunctional monomer include 1,6-hexanediol diacrylate, bisphenol A epoxy acrylate, tripropylene glycol diacrylate, tricyclodecane dimethylol diacrylate, and the like. These may be used alone or can also be used in combination of two or more.

The monofunctional monomer has a large effect of lowering the Young's modulus as compared with the bifunctional monomer and the polyfunctional monomer. This is because the monofunctional monomer has a greater action of reducing the crosslinking points in the molecular structure than the bifunctional monomer and the polyfunctional monomer. The photoinitiator becomes a radical when it absorbs ultraviolet rays, and can continuously polymerize an unsaturated double bond of reactive oligomer and reactive monomer. As the photoinitiator, for example, alkylphenone photopolymerization initiator or acylphosphine oxide photopolymerization initiator can be used. These may be used alone or can be used in combination of two or more.

Further, as the oligomer constituting the colored layer 13, similarly to the primary coating layer 11 and the secondary coating layer 12 described above, it is preferable to use oligomer in which aromatic isocyanate and hydroxyethyl acrylate are added to polyol using polypropylene glycol, and the Young's modulus can be adjusted by changing the molecular weight of the polyol (polypropylene glycol) of the intermediate block, or using bifunctional monomer or polyfunctional monomer. Further, as the resin constituting the colored layer 13, for example, urethane acrylate or hydroxypivalic acid neopentyl glycol acrylic acid adduct can be used, and in addition, by adding bisphenol A epoxy acrylate or the like, the toughness can be increased. When the colored secondary coating layer 12a also serves as the colored layer 13, the colored secondary coating layer 12a may include these components.

Specifically, as the oligomer, it is preferable to use oligomer in which aromatic isocyanate and hydroxyethyl acrylate are added to polyol using polypropylene glycol, and the Young's modulus can be adjusted by changing the molecular weight of the polyol (polypropylene glycol) of the intermediate block, or using bifunctional monomer or polyfunctional monomer. Further, for example, by adding bisphenol A epoxy acrylate or the like as the oligomer, the toughness can be increased, and further, urethane acrylate, hydroxypivalic acid neopentyl glycol acrylic acid adduct, or the like can also be used. Furthermore, in order to improve the slipperiness of the surface, it is preferable to add modified silicone. For example, both-end type acrylic-modified silicone, one-end type acrylic-modified silicone, side chain end acrylic-modified silicone, or the like can be used. As the photoinitiator, for example, 2-methyl-1-(4-methylthiophenyl)-2-morpholinopropan-1-one, 2-benzyl-2-dimethylamino-1-(4-morpholinophenyl)-butanone-1,2,4-diethylthioxanthone, 2,4,6-trimethylbenzoyl-diphenyl-phosphine oxide, 1-hydroxy-cyclohexyl-phenyl-ketone, or the like can be used.

Regarding the outer diameter of each layer in the colored optical fiber 1, in order to maintain the characteristics of an optical fiber strand (see below), generally, the outer diameter of the optical fiber 10 is preferably set within the range of 80 µm to 125 µm, the outer diameter of the primary coating layer 11 is preferably set within the range of 120 µm to 200 µm, the outer diameter of the secondary coating layer 12 is preferably set within the range of 160 µm to 242 µm, and the outer diameter of the colored layer 13 is preferably set within the range of 173 µm to 255 µm. Further, as shown in FIG. 2, when the secondary coating layer 12 has a configuration that also serves as the colored layer 13, the outer diameter of the colored secondary coating layer 12a is preferably set within the range of 160 µm to 255 µm.

(V) Manufacturing Method of Optical Fiber Ribbon 2:

An example of a method of manufacturing the optical fiber ribbon 2 according to the present invention will be described. In the following, a glass optical fiber 10 will be described as an example of the optical fiber 10, and a silica glass optical fiber (glass optical fiber 10) coated with the primary coating layer 11 and the secondary coating layer 12 is referred to as an optical fiber strand.

To manufacture the colored optical fiber 1, for example, first, a preform containing silica glass as a main component is heated and melted by a drawing furnace to obtain the silica glass optical fiber (glass optical fiber 10). Next, a component containing liquid ultraviolet curable resin is applied to the glass optical fiber 10 using a coating die, and subsequently, ultraviolet rays are applied to the component containing the ultraviolet curable resin applied by an ultraviolet irradiation device (UV irradiation device) to cure such the component. In this way, an optical fiber strand in which the glass optical fiber 10 is coated with the primary coating layer 11 and the secondary coating layer 12 is manufactured. After drawing, the primary coating layer 11 and the secondary coating layer 12 are formed by immediately coating the outer periphery of the glass optical fiber 10 with the component containing the ultraviolet curable resin, which can prevent a decrease in strength of the obtained optical fiber strand.

In the next step, the outer periphery of the obtained optical fiber strand is coated with the colored layer 13, whereby the colored optical fiber 1 is manufactured. In addition, as described above, the secondary coating layer 12 may be colored to obtain the colored optical fiber 1 including the colored secondary coating layer 12a as the outermost layer.

Then, the obtained colored optical fibers 1 are arranged in a desired number, the material forming the intermittent connecting portion 3 is applied in a predetermined pattern and cured under a predetermined condition to form the intermittent connecting portions 3, and the optical fiber ribbon 2 can be obtained.

The manufacture of the optical fiber ribbon 2 can be carried out, for example, by a manufacturing apparatus including an aligning unit that gathers a plurality of the colored optical fibers 1 and aligns these in parallel, and an application roll 6 (see FIG. 7 and the like described later) that can intermittently apply the constituent material of the intermittent connecting portion 3 on a part of the outer periphery, and can be carried out, for example, by using the manufacturing apparatus and the manufacturing method disclosed in JP 6169060 B2.

That is, the optical fiber ribbon 2 may be obtained as follows. The plurality of colored optical fibers 1 are brought into contact with each application roll to intermittently apply the constituent material of the intermittent connecting portion 3 to side faces of the colored optical fibers 1, while the arrangement unit aligns the colored optical fibers 1 so that the side faces thereof to which the material forming the intermittent connecting portion 3 is applied are in contact with each other. The constituent material is cured by ultraviolet irradiation or the like so that the colored optical fibers 1 are intermittently connected with the intermittent connecting portion 3.

Figure 7:
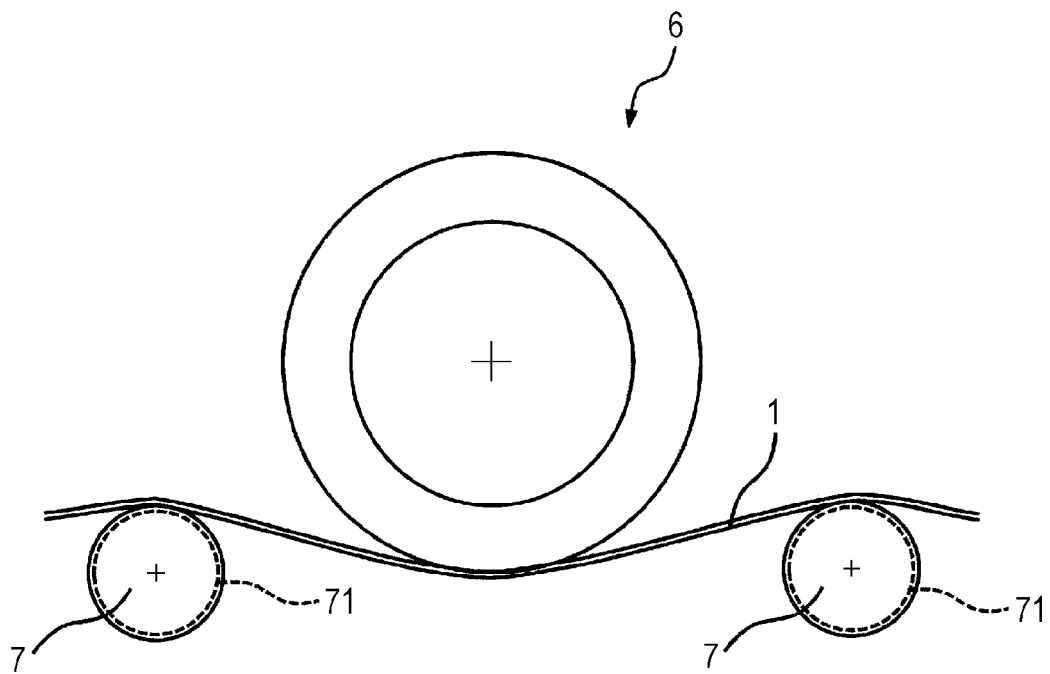
FIG. 7 is a view showing an example of an application roll.

As the application roll 6 capable of intermittently applying the constituent material of the intermittent connecting portion 3, for example, a structure as shown in FIG. 7 may be employed. FIG. 7 is a view showing an example of the application roll 6. The application roll 6 shown in FIG. 7 employs a configuration in which the application roll 6 is sandwiched by a pair of V-groove rolls 7 in which V-grooves 71 are formed, and the colored optical fiber 1 will come into contact with the application roll 6.

Figure 8:
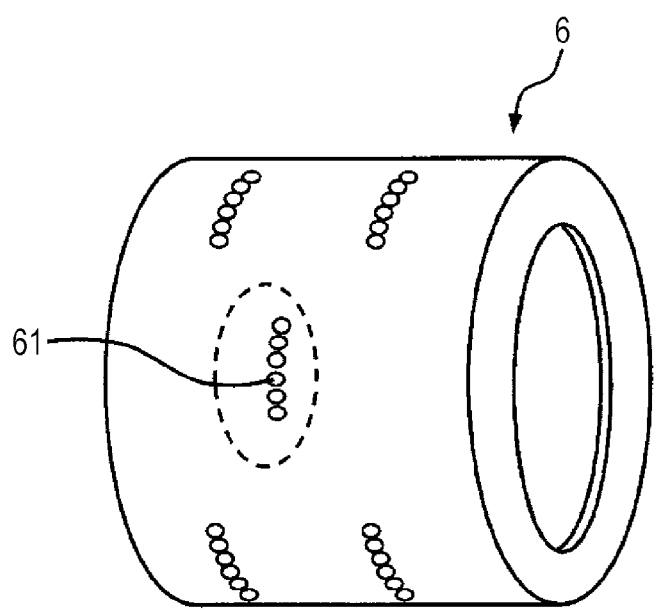
FIG. 8 is a perspective view showing another example of the application roll.
Figure 9:
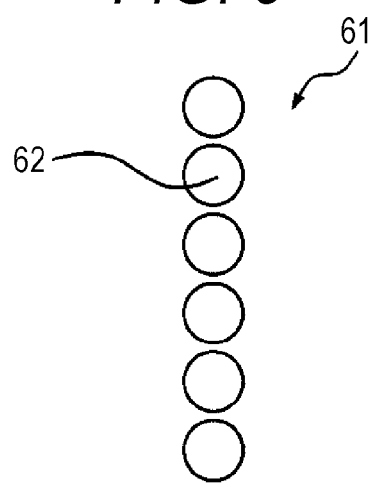
FIG. 9 is an enlarged view of an application hole formed in the application roll in FIG. 8.

Further, FIG. 8 is a perspective view showing another example of the application roll 6, and FIG. 9 is an enlarged view of an application hole 61 formed in the application roll 6 in FIG. 8. The application roll 6 shown in FIG. 8 is provided with the application hole 61 shown in FIG. 9, and the application hole 61 is not one continuous long hole but is configured by a plurality of small holes 62 arranged in a line. That is, the application hole 61 is formed by arranging the plurality of small holes 62 continuously in a predetermined width and a predetermined length.

By using the application hole 61 having such a configuration, the extrusion amount of the material (ultraviolet curable resin) R forming the intermittent connecting portion becomes stable. In the application hole 61, since the small holes 62 are independent of each other, a substantially constant material R is extruded from each of the small holes 62. Therefore, since a substantially constant amount of the material R can be extruded into the application hole 61 (the range in which the small holes 62 are formed), the application amount of the material R to the colored optical fiber 1 becomes stable.

Figure 10:
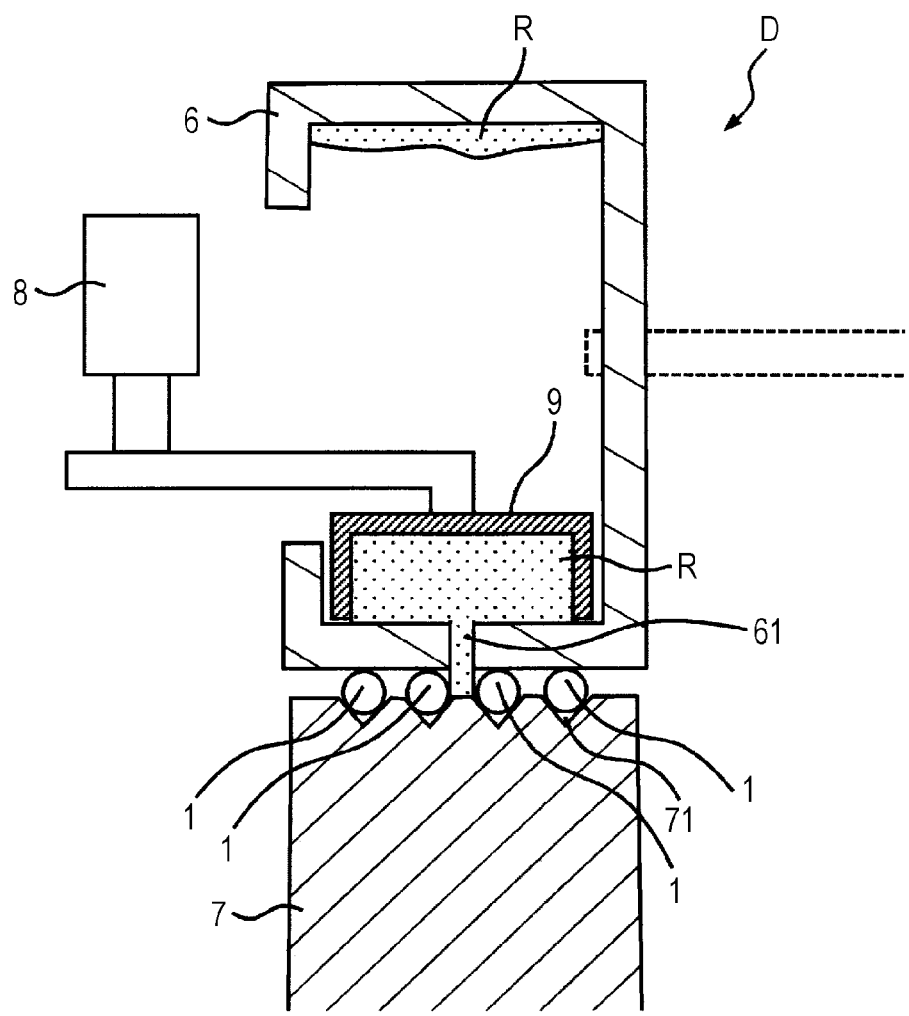
FIG. 10 is a cross-sectional view showing an apparatus in the vicinity of the application roll.

FIG. 10 is a cross-sectional view showing an apparatus D in the vicinity of the application roll 6. The apparatus D shown in FIG. 10 employs a configuration in which, in the vicinity of the application roll 6, a die 9 is pressed in the extrusion direction of the material R with a predetermined load, and an air cylinder 8 is used as a member for holding the die 9.

In the apparatus D, the die 9 is pressed by the air cylinder 8 with a constant load toward the application side of the material R to the colored optical fibers 1 which are in contact with the V-grooves 71 of the V-groove rolls 7, and the material R is applied through the application hole 61. An elastic member such as a spring may be provided instead of the air cylinder 8.

(VI) Effect of Invention:

In the optical fiber ribbon 2 according to the present invention described above, in addition to the polyol having a weight average molecular weight of 2,500 to 4,000, the rheology control agent is contained in a specific range in the material forming the intermittent connecting portion 3 (ultraviolet curable resin composition). With such a configuration, the material forming the intermittent connecting portion 3 has a relatively high viscosity in the low shear rate region and a relatively low viscosity in the high shear rate region, with respect to the material, whereas shear thinning is shifted to a shear rate region higher than $10^6 1/s$ which is a high shear rate region, and the property of lengthening the Newtonian region is provided. Thus, scattering of the material due to the centrifugal force generated by the rotation of the application roll 6 that applies the material at the time of manufacture and the like can be suppressed, and the application amount to the colored optical fiber 1 can be stabilized. Further, the optical fiber ribbon 2 capable of maintaining suppression of such scattering and the like even in the manufacture at a high linear velocity is provided.

The optical fiber cable 4 including the optical fiber ribbons 2 according to the present invention enjoys the effects of the above-described optical fiber ribbon 2. That is, the optical fiber cable 4 including the optical fiber ribbons 2 which suppress scattering of the material by the application roll 6 and the like during manufacture of the intermittent connecting portion 3, can stabilize the application amount to the colored optical fiber 1, and can maintain suppression of such scattering and the like even in the manufacture at a high linear velocity is provided.

Figure 11:
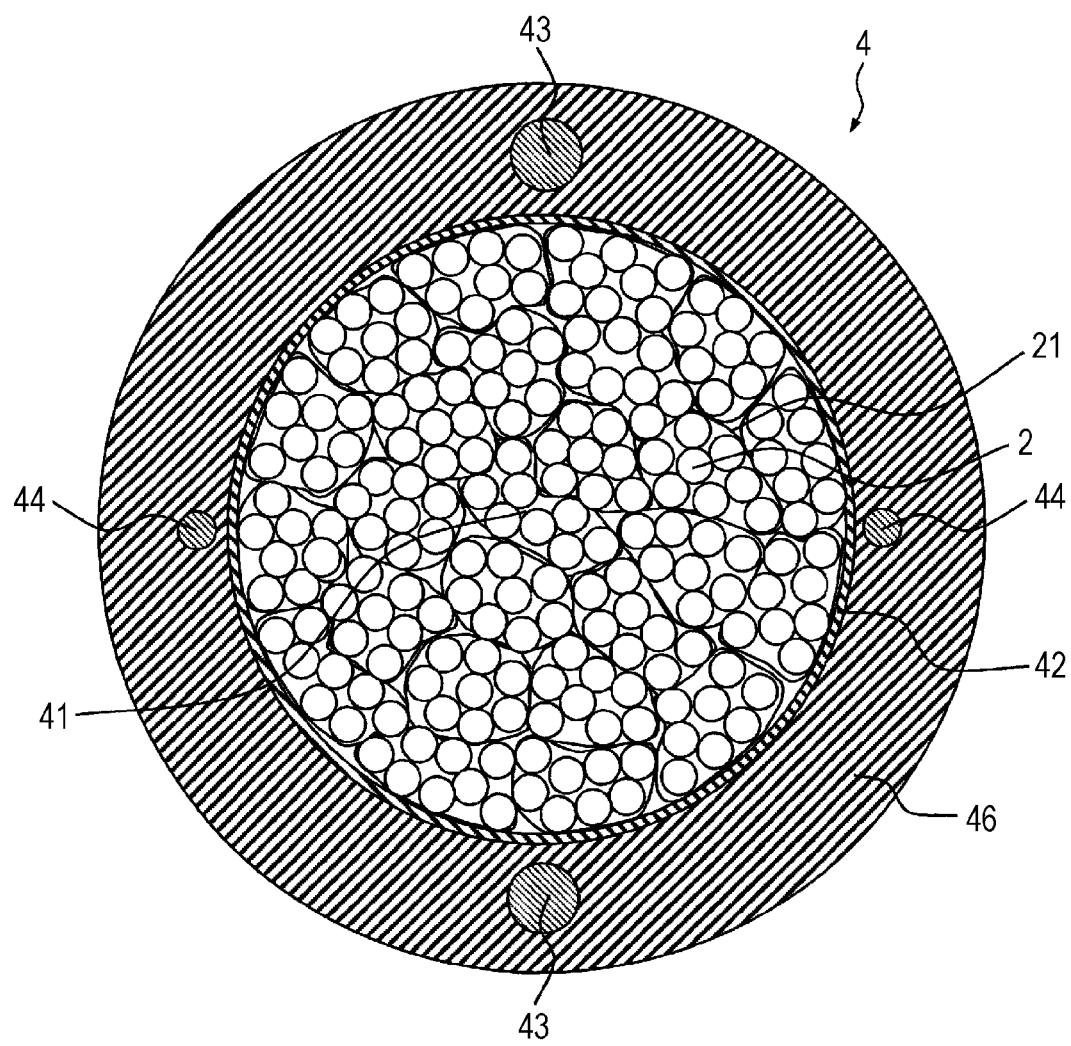
FIG. 11 is a view showing one aspect of an optical fiber cable.

Here, the configuration of the optical fiber cable 4 is not particularly limited as long as it includes the optical fiber ribbons 2 according to the present invention. FIG. 11 is a view showing one aspect of the optical fiber cable 4. The cable core 41 is configured by twisting or bundling a predetermined number (twenty-five in FIG. 11) of the optical fiber units 21 obtained by twisting or bundling a predetermined number (eight in FIG. 11) of the optical fiber ribbons 2 having a predetermined number of cores. A buffer layer 42 formed of, for example, a non-woven fabric press winding tape is formed around the cable core 41, and a coating layer (sheath) 46 made of thermoplastic resin or the like in which two steel wires (tension members) 43 and two tear strings 44 are embedded is further formed around the buffer layer 42.

Figure 12:
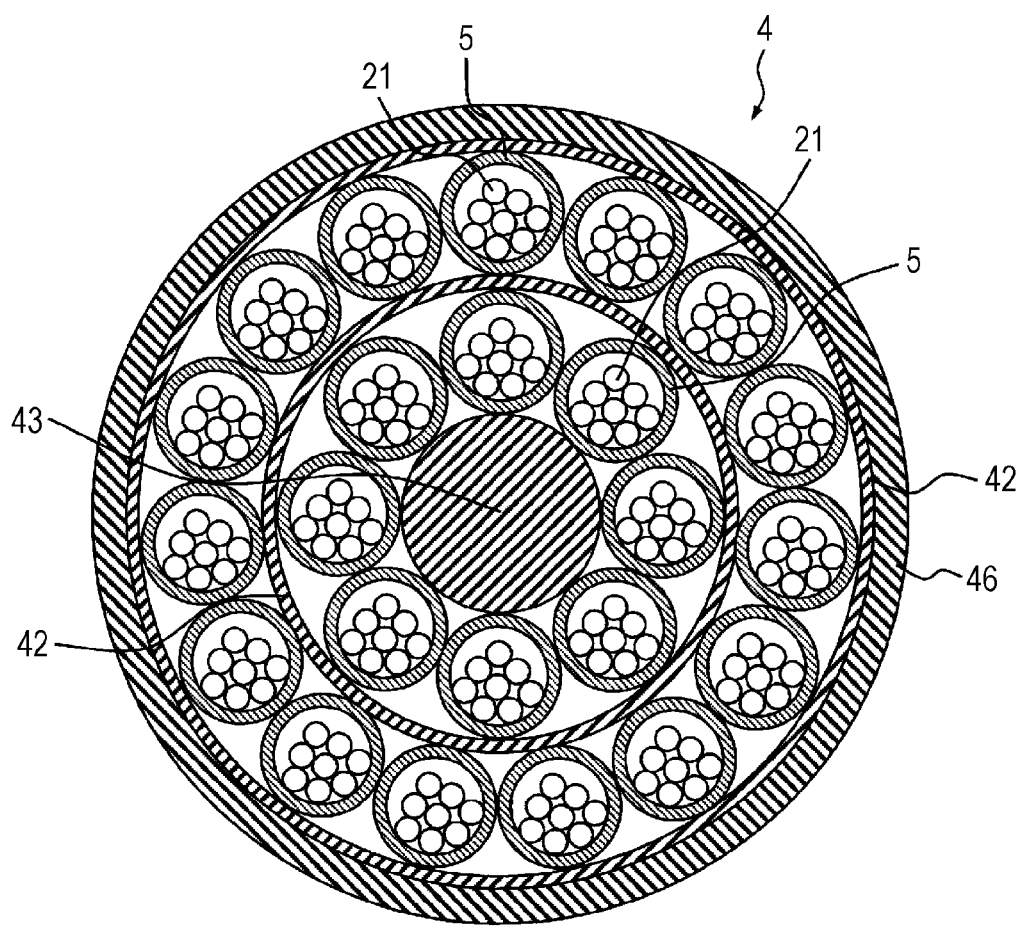
FIG. 12 is a view showing another aspect of the optical fiber cable.

FIG. 12 is a view showing another aspect of the optical fiber cable 4. In the optical fiber cable 4 of FIG. 12, a predetermined number (eight in FIG. 12) of the optical fiber units 21 obtained by twisting or bundling a predetermined number of the optical fiber ribbons 2 (not shown in FIG. 12) having a predetermined number of cores are embedded in a loose tube 5 in a state of being twisted or bundled, and a predetermined number (eight in FIG. 12) of the optical fiber units 21 and the loose tubes 5 in which the optical fiber units 21 are embedded are twisted around the steel wire (tension member) 43.

A buffer layer 42 formed of, for example, a non-woven fabric press winding tape is formed therearound, and a predetermined number (fifteen in FIG. 12) of the optical fiber units 21 and loose tubes 5 in which the optical fiber units 21 are embedded are twisted and arranged around the buffer layer 42. Around this, a buffer layer 42 formed of, for example, a non-woven fabric pressing tape and a coating layer (sheath) 46 made of thermoplastic resin or the like are formed.

For the sake of convenience, the hatchings of the optical fiber ribbons 2 in FIG. 11 and the optical fiber units 21 in FIG. 12 are omitted in FIGS. 11 and 12. Further, the reference symbols of the optical fiber ribbons 2 and the optical fiber units 21 in FIG. 11 and the reference symbols of the optical fiber units 21 and the loose tubes 5 in FIG. 12 are shown in some parts.

As the optical fiber cable 4 according to the present invention, optical fiber cables such as a center tube type, a loose tube type, and a slot type are conceivable, and the optical fiber cable 4 is not particularly limited as long as it is an optical fiber cable accommodating the optical fiber ribbons 2. The coating layer 46 can be, for example, 2.0 to 3.0 mm, but is not particularly limited to this range.

(VII) Modification of Embodiment:

It should be noted that the above-described aspect shows one aspect of the present invention, and the present invention is not limited to the above-described embodiment. It is needless to say that modifications and improvements that include the configurations of the present invention and are made within the range in which the object of the present invention can be achieved are included in the contents of the present invention. Further, the specific structure, shape, and the like in carrying out the present invention may be any other structure, shape, and the like as long as the objects and effects of the present invention can be achieved. The present invention is not limited to the above-described embodiment, and modifications and improvements within the range in which the object of the present invention can be achieved are included in the present invention.

For example, in the above-described embodiment, the optical fiber ribbon 2 has been described by exemplifying the configuration of twelve cores shown in FIGS. 3 to 5, but the number of cores in the optical fiber ribbon 2 (the number of colored optical fibers 1) can be selectively determined from twelve cores, four cores, eight cores, twenty-four cores, and the like. Further, as for the cross-sectional shape of the intermittent connecting portion 3, the aspect in which the two sides in contact with the colored optical fibers 1 have a substantially triangular shape having an arc shape is given as an example, but it is not limited thereto, and may be any shape that can intermittently connect the adjacent colored optical fibers 1 in the length direction.

Further, the relationship between the shear rate and the viscosity shown in FIG. 6 is merely an example. For example, as for the line 1 in which the component satisfying the requirements of the present invention is used as the constituent material of the intermittent connecting portion 3, the shape of the curve and the like are changed within a range that does not impair the object and effects of the invention by adjusting the content of the type of component used in the intermittent connecting portion 3 within a range in which the requirements of the present invention are satisfied.

Further, in the above-described embodiment, as the optical fiber cable 4 including the optical fiber ribbons 2, the structures shown in FIG. 11 and FIG. 12 are described as an example. The structure of the optical fiber cable 4 is not limited to the above-described configurations. In addition, for example, the type, the thickness, and the like of the coating layer 46, the number and the size of the colored optical fibers 1 and the optical fiber ribbons 2, the number and the size of the optical fiber units 21, the number of the optical fiber ribbons 2 in the optical fiber unit 21, the type, the number, and the size of the steel wires (tension members) 43, the type and the thickness of the buffer layer 42, and the number of layers can be freely selected. In addition, the outer diameter and cross-sectional shape of the optical fiber cable 4 can be freely selected.

In addition, the specific structure, shape, and the like when the present invention is carried out may be other structures and the like as long as the object of the present invention can be achieved.

EXAMPLES

Hereinafter, the present invention will be described in more detail based on Examples and Comparative Examples, but the present invention is not limited thereto.

Manufacture of Optical Fiber Ribbon:

Using the contents shown in Table 1 and the components shown below, optical fiber ribbons each having the configuration shown in FIG. 3 to FIG. 5 and including the colored optical fibers shown in FIGS. 1 and 2 were manufactured by the methods shown in the following items (1) and (2). In addition, in the following contents, a molecular weight refers to a "weight average molecular weight." The following components were used for the primary coating layer, the secondary coating layer, the colored layer, and the intermittent connecting portion.

(1) Manufacture of Colored Optical Fiber:

A primary coating layer (primary layer) having an outer diameter of 195 μm and a secondary coating layer (secondary layer) having an outer diameter of 242 μm were coated around a glass optical fiber being an optical fiber and formed of a quartz glass having an outer diameter of 125 μm to obtain an optical fiber strand. The obtained optical fiber strand was coated with a colored layer (a component to be a colored layer was a component a) around the secondary coating layer in a separate step to obtain a colored optical fiber having an outer diameter of 255 μm having a structure shown in FIG. 1.

(2) Manufacture of Colored Optical Fiber:

A primary coating layer (primary layer) having an outer diameter of 185 μm and a colored secondary coating layer (a component to be a colored secondary coating layer was a component b) having an outer diameter of 255 μm were coated around a glass optical fiber being an optical fiber and formed of a quartz glass having an outer diameter of 125 μm to obtain a colored optical fiber having an outer diameter of 255 μm and having the configuration shown in FIG. 2.

(Components of Primary Coating Layer and Secondary Coating Layer)

The primary coating layer and the secondary coating layer use oligomer that uses polypropylene glycol as ultraviolet curable resin (which refers to oligomer in which polypropylene glycol is used as an intermediate block, and, as a skeleton component, hydroxyethyl acrylate is bound to hydroxyl groups at both ends thereof through tolylene diisocyanate), diluting monomer, photoinitiator, and additive, which were mixed in appropriate amounts.

(a) Component a (Colored Optical Fiber Having Configuration of FIG. 1):

In the ultraviolet curable resin that constitutes the component a (coloring material component a) to be the colored layer, urethane acrylate or bisphenol A epoxy acrylate was used as the oligomer, and bifunctional monomer or polyfunctional monomer was added as monomer, so that the Young's modulus was adjusted. Further, both end-type acrylic modified silicone was contained in an amount of 3% by mass with respect to the whole colored layer. In the photoinitiator, 2-methyl-1-(4-methylthiophenyl)-2-morpholinopropan-1-one (Irgacure907), 2,4,6-trimethylbenzoyl-diphenyl-phosphine oxide (Lucirin TPO), and 2,4-diethylthioxanthone (kayacure-DETX-S) were added. The oxygen concentration in the production was adjusted to 3 to 5%, and the ultraviolet irradiation dose was set to 80 mJ/cm$^2$ or less.

(b) Component b (Colored Optical Fiber Having Configuration of FIG. 2):

In the ultraviolet curable resin that constitutes the component b (coloring material component b) to be the colored secondary coating layer (colored layer), as the oligomer, oligomer in which aromatic isocyanate and hydroxyethyl acrylate were added to polyol using polypropylene glycol was used, and the Young's modulus was adjusted by changing the molecular weight of the polyol (polypropylene glycol) of the intermediate block, or using bifunctional monomer or polyfunctional monomer. Further, in order to improve the toughness, bisphenol A epoxy acrylate was added, and side chain end acrylic-modified silicone was contained in 2% by mass with respect to the whole colored layer. As the photoinitiator, 1-hydroxy-cyclohexyl-phenyl-ketone (Irgacure184) and 2,4,6-trimethylbenzoyl-diphenyl-phosphine oxide (Lucirin TPO) were added. The oxygen concentration in the production was adjusted to 0.01% to 22%, and the ultraviolet irradiation dose was set to 80 mJ/cm$^2$ or less.

(3) Manufacture of Optical Fiber Ribbon:

Twelve colored optical fibers obtained as described above were arranged in parallel. In order to obtain the structure as shown in FIG. 3 to FIG. 5, by the manufacturing apparatus and manufacturing method shown in JP 6169060 B2, by using the device shown in FIG. 7 and FIG. 8 as the application roll, using the apparatus shown in FIG. 10 as the apparatus in the vicinity of the application roll, and using three kinds of linear velocity (which refers to the velocity at which the colored optical fibers is advanced, the same applies hereinafter), specifically, 200 m/min, 400 m/min, and 600 m/min as described below, the following materials were used as the material constituting the intermittent connecting portion (ultraviolet curable resin composition) and applied while adjusting the resin pressure (application pressure) so as to have a predetermined pattern (the length of the intermittent connecting portion: 30 mm, the length of the non-connecting portion: 10 mm, and the length of the pitch: 80 mm), and were cured. In this manner, the intermittent connecting portion (and the non-connecting portion) was formed as the optical fiber ribbon.

Further, the viscosity and the like of the material forming the intermittent connecting portion when the optical fiber ribbon was manufactured was confirmed by the following method, and the presence or absence of scattering of the material during application of the material forming the intermittent connecting portion was also confirmed. Then, the adhesive strength between the colored optical fiber and the intermittent connecting portion was measured, and the degree of mixing (mixability) of the rheology control agent with the base material and the appearance of the intermittent connecting portion were also confirmed as a reference. The results are shown in Table 1 in combination with the compositions.

Base Material Used as Component of Intermittent Connecting Portion:

As the ultraviolet curable resin, oligomer (which refers to oligomer in which polypropylene glycol having a weight average molecular weight of 2,000 is used as an intermediate block, and, as a skeleton component, hydroxyethyl acrylate is bound to hydroxyl groups at both ends thereof through tolylene diisocyanate) was used, as monofunctional monomer, isobornyl acrylate and PO-modified nonylphenol acrylate were used, and, as bifunctional monomer, tricyclodecane dimethylol diacrylate and 1,6-hexanediol diacrylate were used. As the photoinitiator, 1-hydroxy-cyclohexyl-phenyl-ketone and 2,4,6-trimethylbenzoyl-diphenyl-phosphine oxide were added. Further, hindered amine light stabilizer as light stabilizer and silicone (weight average molecular weight: about 10,000) were mixed in appropriate amounts as additives. A material composed of these components was used as a base material, and polyol or rheology control agent described below was contained at a predetermined content to obtain the material (ultraviolet curable resin composition) forming the intermittent connecting portion (in Comparative Example 1, only the polyol was added, and in Comparative Example 2, only the rheology control agent was added).

Example 1

In the base material, as polyol, polypropylene glycol having a weight average molecular weight of 3,000 (PP3000: manufactured by Sanyo Chemical Industries, Ltd.) was added in an amount of 23% by mass with respect to a whole ultraviolet curable resin composition (a material that constitutes the intermittent connecting portion, which may be hereinafter simply referred to as "composition" in some cases). Further, as rheology control agent, hydrophobic fumed silica (AEROSIL R974: manufactured by Nippon Aerosil Co., Ltd.) was added in an amount of 5% by mass with respect to the whole composition.

Example 2

In the base material, as polyol, polypropylene glycol having a weight average molecular weight of 3,000 (PP3000: manufactured by Sanyo Chemical Industries, Ltd.) was added in an amount of 23% by mass with respect to a whole composition. Further, as rheology control agent, hydrophobic fumed silica (AEROSIL R974: manufactured by Nippon Aerosil Co., Ltd.) was added in an amount of 4% by mass with respect to the whole composition.

Example 3

In the base material, as polyol, polypropylene glycol having a weight average molecular weight of 3,000 (PP3000: manufactured by Sanyo Chemical Industries, Ltd.) was added in an amount of 25% by mass with respect to a whole composition. Further, as rheology control agent, hydrophobic fumed silica (AEROSIL R974: Nippon Aerosil Co., Ltd.) was added in an amount of 6% by mass with respect to the whole composition.

Example 4

In the base material, as polyol, polypropylene glycol having a weight average molecular weight of 3,000 (PP3000: manufactured by Sanyo Chemical Industries, Ltd.) was added in an amount of 20% by mass with respect to a whole composition. Further, as rheology control agent, hydrophobic fumed silica (AEROSIL R974: manufactured by Nippon Aerosil Co., Ltd.) was added in an amount of 5% by mass with respect to the whole composition.

Example 5

In the base material, as polyol, polypropylene glycol having a weight average molecular weight of 3,000 (PP3000: manufactured by Sanyo Chemical Industries, Ltd.) was added in an amount of 4% by mass with respect to a whole composition. Further, as rheology control agent, hydrophobic fumed silica (AEROSIL R974: manufactured by Nippon Aerosil Co., Ltd.) was added in an amount of 1% by mass with respect to the whole composition.

Example 6

In the base material, as polyol, polypropylene glycol having a weight average molecular weight of 3,000 (PP3000: manufactured by Sanyo Chemical Industries, Ltd.) was added in an amount of 30% by mass with respect to a whole composition. Further, as rheology control agent, hydrophobic fumed silica (AEROSIL R974: manufactured by Nippon Aerosil Co., Ltd.) was added in an amount of 10% by mass with respect to the whole composition.

Example 7

In the base material, as polyol, polypropylene glycol having a weight average molecular weight of 3,000 (PP3000: manufactured by Sanyo Chemical Industries, Ltd.) was added in an amount of 23% by mass with respect to a whole composition. Further, as rheology control agent, hydrophilic fumed silica (AEROSIL 200: manufactured by Nippon Aerosil Co., Ltd.) was added in an amount of 5% by mass with respect to the whole composition.

Comparative Example 1

In the base material, as polyol, polypropylene glycol having a weight average molecular weight of 3,000 (PP3000: manufactured by Sanyo Chemical Industries, Ltd.) was added in an amount of 23% by mass with respect to a whole composition. Rheology control agent was not added.

Comparative Example 2

In the base material, as rheology control agent, hydrophobic fumed silica (AEROSIL R974: manufactured by Nippon Aerosil Co., Ltd.) was added in an amount of 5% by mass with respect to the whole composition. Polyol was not added.

Comparative Example 3

In the base material, as polyol, polypropylene glycol having a weight average molecular weight of 3,000 (PP3000: manufactured by Sanyo Chemical Industries, Ltd.) was added in an amount of 17% by mass with respect to a whole composition. Further, as rheology control agent, hydrophobic fumed silica (AEROSIL R974: manufactured by Nippon Aerosil Co., Ltd.) was added in an amount of 0.5% by mass with respect to the whole composition.

(Measuring Method for Viscosity, Calculating Method for Viscosity, and the Like)

The viscosity from the low shear rate region to the high shear rate region was measured using a rheometer (MCR301: Anton Paar). Frequency dispersion (relationship between the frequency and the viscosity) was determined under conditions of 25φ parallel plate, gap 0.5 mm, frequency 62.8 to 0.68 rad/s (10 to 0.1 Hz log 4 points/digit 9 points in total), strain amount 5%, and temperature −50° C. to 50° C. (in increments of 10° C.).

Figure 13:
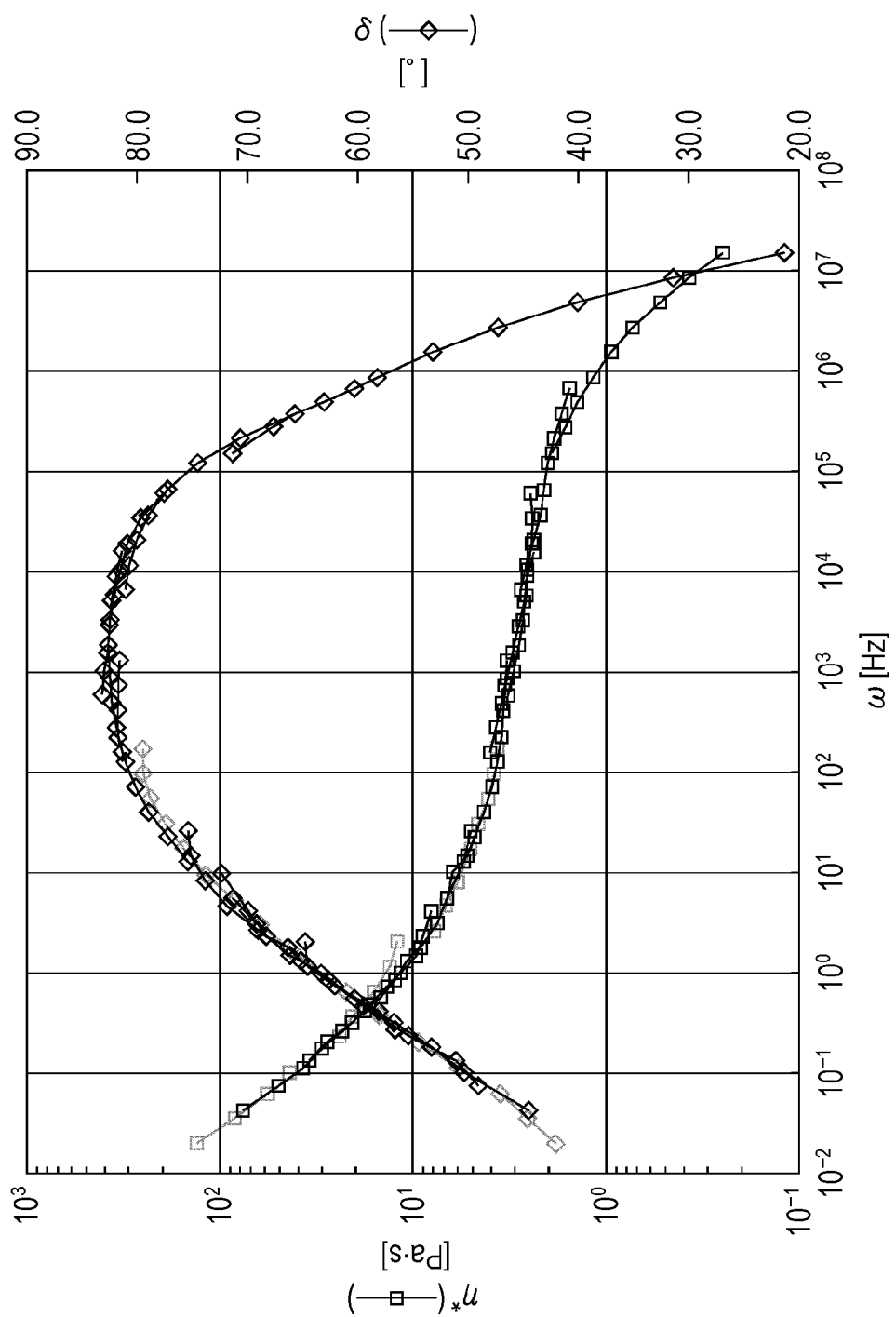
FIG. 13 is a diagram showing master curves.

Next, using the WLF (Williams, Landel, Ferry) formula for the relationship between the frequency ω, the viscosity η, and the phase angle δ with 25° C. at which the material forming the intermittent connecting portion was applied as the reference temperature, a shift factor LogαT that indicated the relationship between the horizontal movement amount and the temperature change was defined, and master curves shown in FIG. 13 were determined.

From the Cox-Merz rule, the frequency ω (rad/s) and the shear rate γ (1/s) could be treated as being equivalent, and hence the frequency was converted from Hz→rad/s→shear rate γ (1/s) and calculated as shown in FIG. 14. FIG. 14 is a diagram showing the relationship between the shear rate and the viscosity. In FIG. 14, Example 1, Comparative Example 1, and Comparative Example 2 are cited as typical examples. Further, in Table 1, as the viscosity (Pa·s), (x) viscosity of a shear rate $10^1$ 1/s determined from the dynamic viscoelasticity at 25° C. (viscosity 25° C. 10^1 1/s), (y) viscoelasticity of a shear rate $10^6$ 1/s determined from the dynamic viscoelasticity at 25° C. (viscosity 25° C. 10^6 1/s), and (z) viscosity of a shear rate of $10^1$ 1/s determined from the dynamic viscoelasticity at 35° C. (viscosity 35° C. 10^1 1/s) are cited, and, as the viscosity ratio (rounded to one decimal place) (viscosity 25° C. 10^1 1/s)/(viscosity 35° C. 10^1 1/s) (=(x)/(z)) is cited.

(Confirmation of Scattering of Material)

Regarding the presence or absence of scattering of the material forming the intermittent connecting portion from the roll when the material was applied between two colored optical fibers when the intermittent connecting portion was formed using the above-described apparatus, scattering of 50 km in length was confirmed with three kinds of linear velocity, specifically, 200, 400, and 600 m/min under a state in which the apparatus was covered with an acrylic case. A case where it was determined that application of 50 km could be performed without contaminating the roll portion and other pass lines and the application amount was stable was defined as "○", and a case where many scattering materials were confirmed and dropped on the colored optical fiber, or the roll portion and other pass lines were contaminated and application of 50 km could not be performed was determined as "x". If all three kinds of linear velocity were determined as "○", the overall was also "○". On the other hand, if at least one of the three kinds of linear velocity was determined as "x", the overall was also "x".

(Measurement of Adhesive Strength)

The two colored optical fibers on which the intermittent connecting portion was formed were taken out, the colored optical fibers were fixed to an upper part of a tensile tester, a wire of φ0.5 mm was passed between the two colored optical fibers, the wire was pulled downward at a velocity of 100 mm/min and the strength (N) required to peel the colored optical fibers from the intermittent connecting portion was measured, and the measured value was regarded as the adhesive strength between the colored optical fiber and the intermittent connecting portion. The measurement object was an optical fiber ribbon manufactured at 600 m/min.

(Appearance (Evaluated as a Reference))

The ground side, the back surface, and the cross-sectional state of the application roll were observed using a digital microscope VHX-5000 (manufactured by Keyence Corporation). A case where the material (resin composition) was well applied on the front and back surfaces of the adjacent colored optical fibers was defined as "○", a case where there was no practical problem but application to one surface was insufficient was defined as "Δ", and a case where application to one surface was excessively insufficient and it was determined that there was a practical problem was defined as "x".

(Mixability (Evaluated as a Reference))

The mixing and defoaming of the rheology control agent with respect to the resin composition were performed using a stirring/defoaming apparatus (ARE310: manufactured by THINKY CORPORATION) at a rotation speed of 2,000 rpm. Then, using a spin coater 1H-DX-2 (manufactured by Mikasa Co., Ltd.), a rotation speed was set so that the glass substrate became 35 μm, and spin coat was performed. Regarding the degree of mixing and application properties at that time, it was visually confirmed whether or not the rheology control agent was well mixed and dispersed in the resin composition, and a case where the rheology control agent is smoothly dispersed and it was determined that the dispersion is good was defined as "○", a case where there was no practical problem, but a flow or the like was confirmed on the surface and it was determined that the dispersion was in a slightly bad state was defined as "Δ", and a case where it was determined that the dispersion was in a bad state was defined as "x".

(Composition and Results)

TABLE 1

| | | Examples | | | | | | | Comparative Examples | | |
|---|---|---|---|---|---|---|---|---|---|---|---|
| | | 1 | 2 | 3 | 4 | 5 | 6 | 7 | 1 | 2 | 3 |
| Coloring material component a | Configuration of FIG. 1 | ○ | | ○ | | ○ | ○ | | ○ | ○ | |
| Coloring material component b | Configuration of FIG. 2 | | ○ | | ○ | | | ○ | | | ○ |
| Polyol (% by mass) | Polypropylene glycol | 23 | 23 | 25 | 20 | 4 | 30 | 23 | 23 | 0 | 17 |
| Rheology control agent (% by mass) | Hydrophobic fumed silica | 5 | 4 | 6 | 5 | 1 | 10 | 0 | 0 | 5 | 0.5 |
| | Hydrophilic fumed silica | 0 | 0 | 0 | 0 | 0 | 0 | 5 | 0 | 0 | 0 |
| Viscosity (Pa · s) | (x) viscosity 25° C. 10^1 1/s | 8.2 | 5.6 | 9.3 | 9.8 | 3 | 9 | 11 | 1.9 | 47 | 5 |
| | (y) viscosity 25° C. 10^6 1/s | 1.8 | 1.5 | 2.2 | 2.4 | 1.2 | 2 | 0.4 | 1.8 | 0.06 | 0.15 |
| | (z) viscosity 35° C. 10^1 1/s | 4.4 | 2.8 | 5 | 5.5 | 1.5 | 4.5 | 6 | 0.9 | 15 | 2.3 |
| Viscosity ratio | (x)/(z) | 1.9 | 2.0 | 1.9 | 1.8 | 2.0 | 2.0 | 1.8 | 2.1 | 3.1 | 2.2 |
| Confirmation of material | Linear velocity 200 m/min | ○ | ○ | ○ | ○ | ○ | ○ | ○ | ○ | X | ○ |

TABLE 1-continued

| | | Examples | | | | | | | Comparative Examples | | |
|---|---|---|---|---|---|---|---|---|---|---|---|
| | | 1 | 2 | 3 | 4 | 5 | 6 | 7 | 1 | 2 | 3 |
| scattering | Linear velocity 400 m/min | ○ | ○ | ○ | ○ | ○ | ○ | ○ | X | X | X |
| | Linear velocity 600 m/min | ○ | ○ | ○ | ○ | ○ | ○ | ○ | X | X | X |
| Overall | | ○ | ○ | ○ | ○ | ○ | ○ | ○ | X | X | X |
| Adhesive strength (N) | Linear velocity 600 m/min | 0.1 | 0.11 | 0.08 | 0.1 | 0.07 | 0.13 | 0.07 | 0.04 | 0.04 | 0.05 |
| Mixability (reference) | | ○ | ○ | ○ | ○ | ○ | ○ | Δ | — | ○ | ○ |
| Appearance (reference) | | ○ | ○ | ○ | ○ | ○ | ○ | Δ | ○ | ○ | ○ |

Table 1 shows the measurement results of the viscosity. In Examples 1 to 7 in which the intermittent connecting portion contained polyol having a weight average molecular weight of 2,500 to 4,000 and the rheology control agent was contained in an amount of 1 to 10% by mass with respect to the whole intermittent connecting portion, scattering of the material was not observed even when the linear velocity was set to 600 m/min, it could be determined that the application amount was stable, and the overall determination was "○". As the result of measuring the viscosity of the material forming the intermittent connecting portion (the ultraviolet curable resin composition to be applied), in any of Examples 1 to 7, the viscosity at a shear rate of $10^1$ 1/s determined from the dynamic viscoelasticity at 25° C. was within the range of 3 to 11 Pa·s, and the viscosity at a shear rate of $10^6$ 1/s determined from the dynamic viscoelasticity at 25° C. was within the range of 0.2 to 2.5 Pa·s.

On the other hand, in Comparative Examples 1 to 3, regarding the scattering of the material, scattering of the material was confirmed during application, and the overall determination was "x". As a result of measuring the viscosity of such a material, it was out of the above viscosity range.

From FIG. 14, in Comparative Example 1 that does not contain the rheology control agent, shear thinning in which the viscosity decreases at the boundary of $10^5$ 1/s could be confirmed, and in the evaluation of confirmation of scattering of the material, scattering of the material was confirmed at linear velocities of 400 m/min and 600 m/min.

In Example 1, the Newtonian region was long, the shear thinning shifted after $10^6$ 1/s, and the change in viscosity (decrease in viscosity) in the high shear region was small. Therefore, in the evaluation of confirmation of scattering of the material, scattering of the material was not confirmed even at the linear velocities of 400 m/min and 600 m/min, and it was effective in preventing the scattering of the material.

In Comparative Example 2 containing a predetermined amount of the rheology control agent while not containing the polyol, since the Newtonian region was narrower than that of Example 1 described above, and shear thinning was observed from $10^4$ 1/s as shown in FIG. 14, the coating amount was not stable in the high shear rate region. In the evaluation of confirmation of scattering of the material, scattering of the material was confirmed at a linear velocity of 200 m/min.

The measurement results of the adhesive strength are also shown in Table 1. In Example 1 to Example 5, as a result of measuring the adhesive strength of the material forming the colored optical fiber and the intermittent connecting portion (the ultraviolet curable resin composition to be applied), a high adhesive strength of 0.07 N or more was obtained even in the manufacture at a high linear velocity (600 m/min). On the other hand, since Comparative Examples 1 to 3 did not follow the linear velocity, it was difficult to manufacture a satisfactory optical fiber ribbon, and as the result of measurement of the adhered portion, it was confirmed that the adhesive strength was low (0.07 N or less).

In addition, in the evaluation of the mixability and the appearance performed as a reference, both of those using hydrophobic fumed silica as the rheology control agent were determined as "○". In addition, in Example 7 using the hydrophilic fumed silica, both the mixability and the appearance were determined as "Δ", and there is no problem in actual use.

(Manufacture of Optical Fiber Cable)

An optical fiber cable was manufactured as follows using the optical fiber ribbons of Example 1.

(4) Manufacture of Optical Fiber Cable:

Eighteen (or thirty-six) optical fiber units in which eight optical fiber ribbons including twelve cores were twisted were twisted to obtain a cable core, and a non-woven fabric press winding tape was wound therearound as a buffer layer. Further, a coating layer was formed on the outer periphery of the buffer layer together with FRP of φ4 mm, two steel wires, and two tear strings. For forming a cable, thermoplastic resin was coated as a coating layer (sheath) to obtain a cable having the structure of FIG. 11 (the number of optical fiber units is different).

As described above, it is confirmed that even if the optical fiber ribbons of the present invention are used, these can be made into a cable like the conventional optical fiber ribbons and can be suitably used as an optical fiber cable.

INDUSTRIAL APPLICABILITY

The present invention can be effectively used as a means for providing an optical fiber ribbon and an optical fiber cable capable of preventing a material forming an intermittent connecting portion from scattering at the time of manufacture, and has high industrial applicability.

REFERENCE SIGNS LIST

1 colored optical fiber
1a to 1l colored optical fiber
10 optical fiber (glass optical fiber)
11 primary coating layer (primary layer)
12 secondary coating layer (secondary layer)
12a colored secondary coating layer
13 colored layer 2 optical fiber ribbon
21 optical fiber unit
3 intermittent connecting portion
31, 32 intermittent connecting portion
33, X non-connecting portion (single core portion)
4 optical fiber cable
41 cable core
42 buffer layer
43 steel wire (tension member)
44 tear string
46 coating layer (sheath)
5 loose tube
6 application roll
61 application hole
62 small hole
7 V-groove roll
71 V-groove
8 air cylinder
9 die
D apparatus
R material forming intermittent connecting portion
t1 to t11 colored optical fiber pair

The invention claimed is:

1. An optical fiber ribbon in which colored optical fibers in which at least two coating layers that coat an optical fiber are formed around the optical fiber, and an outermost layer of the coating layers is colored are arranged in parallel, and the adjacent colored optical fibers are connected by intermittent connecting portions in a length direction, wherein the intermittent connecting portion contains polyol having a weight average molecular weight of 2,500 to 4,000, and wherein rheology control agent that shifts the Newtonian region between a low shear rate region and a high shear rate region to the high shear region side is contained in an amount of 1 to 10% by mass with respect to the whole intermittent connecting portion.

2. The optical fiber ribbon according to claim 1, wherein the intermittent connecting portion contains the polyol in an amount of 4 to 30% by mass with respect to the whole intermittent connecting portion.

3. The optical fiber ribbon according to claim 1, wherein the rheology control agent is hydrophobic fumed silica.

4. The optical fiber ribbon according to claim 1, wherein, regarding a viscosity of a material forming the intermittent connecting portion, a viscosity at a shear rate of $10^1$ 1/s determined from a dynamic viscoelasticity at 25° C. is 3 to 11 Pa·s, and a viscosity at a shear rate of $10^6$ 1/s determined from the dynamic viscoelasticity at 25° C. is 0.2 to 2.5 Pa·s.

5. The optical fiber ribbon according to claim 4, wherein a ratio of the viscosity at a shear rate of $10^1$ 1/s determined from the dynamic viscoelasticity at 25° C. to the viscosity at a shear rate of $10^1$ 1/s determined from the dynamic viscoelasticity at 35° C. (the viscosity at 25° C./the viscosity at 35° C.) is 3 or less.

6. The optical fiber ribbon according to claim 1, wherein an adhesive strength between the colored optical fiber and the intermittent connecting portion is 0.07 N or more.

7. An optical fiber cable comprising the optical fiber ribbon according to claim 1.

* * * * *